United States Patent
Nagata et al.

(10) Patent No.: US 7,280,166 B2
(45) Date of Patent: Oct. 9, 2007

(54) IMAGE REPRODUCING DEVICE

(75) Inventors: Shigeru Nagata, Tokyo (JP); Toshiyuki Kuroda, Tokyo (JP); Yasuo Komatsu, Osaka (JP); Toyoaki Kitano, Tokyo (JP); Ikuo Saga, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1019 days.

(21) Appl. No.: 10/089,235

(22) PCT Filed: Jul. 27, 2001

(86) PCT No.: PCT/JP01/06503

§ 371 (c)(1),
(2), (4) Date: Mar. 28, 2002

(87) PCT Pub. No.: WO02/09976

PCT Pub. Date: Feb. 7, 2002

(65) Prior Publication Data

US 2002/0149708 A1    Oct. 17, 2002

(30) Foreign Application Priority Data

Jul. 28, 2000    (JP) .............................. 2000-228412

(51) Int. Cl.
*H04N 5/64*    (2006.01)
(52) U.S. Cl. .................... 348/837; 348/836; 348/839; 725/75
(58) Field of Classification Search ............... 348/836, 348/837, 839, 843, 844, 789, 787; 725/75, 725/76, 77, 78; 224/311; 296/37.7
See application file for complete search history.

(56) References Cited

U.S. PATENT DOCUMENTS

| 5,822,023 A | 10/1998 | Suman et al. |
| 6,246,449 B1 * | 6/2001 | Rosen ........................ 348/837 |
| 6,339,455 B1 * | 1/2002 | Allan et al. .................. 348/837 |
| 6,412,848 B1 * | 7/2002 | Ceccanese et al. ........ 296/37.7 |
| 6,424,386 B1 * | 7/2002 | Shimizu ..................... 348/837 |
| 6,522,368 B1 * | 2/2003 | Tuccinardi et al. ......... 348/837 |
| 7,084,932 B1 * | 8/2006 | Mathias et al. ............. 348/837 |

FOREIGN PATENT DOCUMENTS

EP    0 868 116 A1    9/1998

(Continued)

OTHER PUBLICATIONS

Mobile Entertainment Magazine, pp. 41-44 (Feb./Mar. 2001).

*Primary Examiner*—David Ometz
*Assistant Examiner*—Jean W. Désir
(74) *Attorney, Agent, or Firm*—Birch, Stewart, Kolasch & Birch, LLP

(57) ABSTRACT

In an integrated type video reproducing equipment having a reproducing unit for reproducing the video information, a display unit for displaying the reproduced video information, and a chassis for supporting them, the equipment is provided with supporting means for supporting the displacement of both the units, and fixing means for fixing the displacement so that both the units are able to displace in a predetermined direction and to fixe and house in a predetermined position. Thus, there is provided a small-sized video reproducing equipment which is superior in the operability and visibility when in use as well as in the housing efficiency when housed.

20 Claims, 26 Drawing Sheets

| | FOREIGN PATENT DOCUMENTS | | |
|---|---|---|---|
| JP | 61-137048 U | 8/1986 | |
| JP | 64-15479 U | 1/1989 | |
| JP | 2-149083 A | 6/1990 | |
| JP | 2-158437 | 6/1990 | |
| JP | 3-189620 A | 8/1991 | |
| JP | 4-14549 U | 2/1992 | |
| JP | 7-025289 A | 1/1995 | |
| JP | 7-162783 A | 6/1995 | |
| JP | 08-258632 A | 10/1996 | |
| JP | 10-272990 A | 10/1998 | |
| JP | 10-297391 | 11/1998 | |
| JP | 11-127403 A | 5/1999 | |
| JP | 2000-112394 | 4/2000 | |
| WO | WO98/09842 | 3/1998 | |
| WO | WO 00/38951 | 7/2000 | |

\* cited by examiner

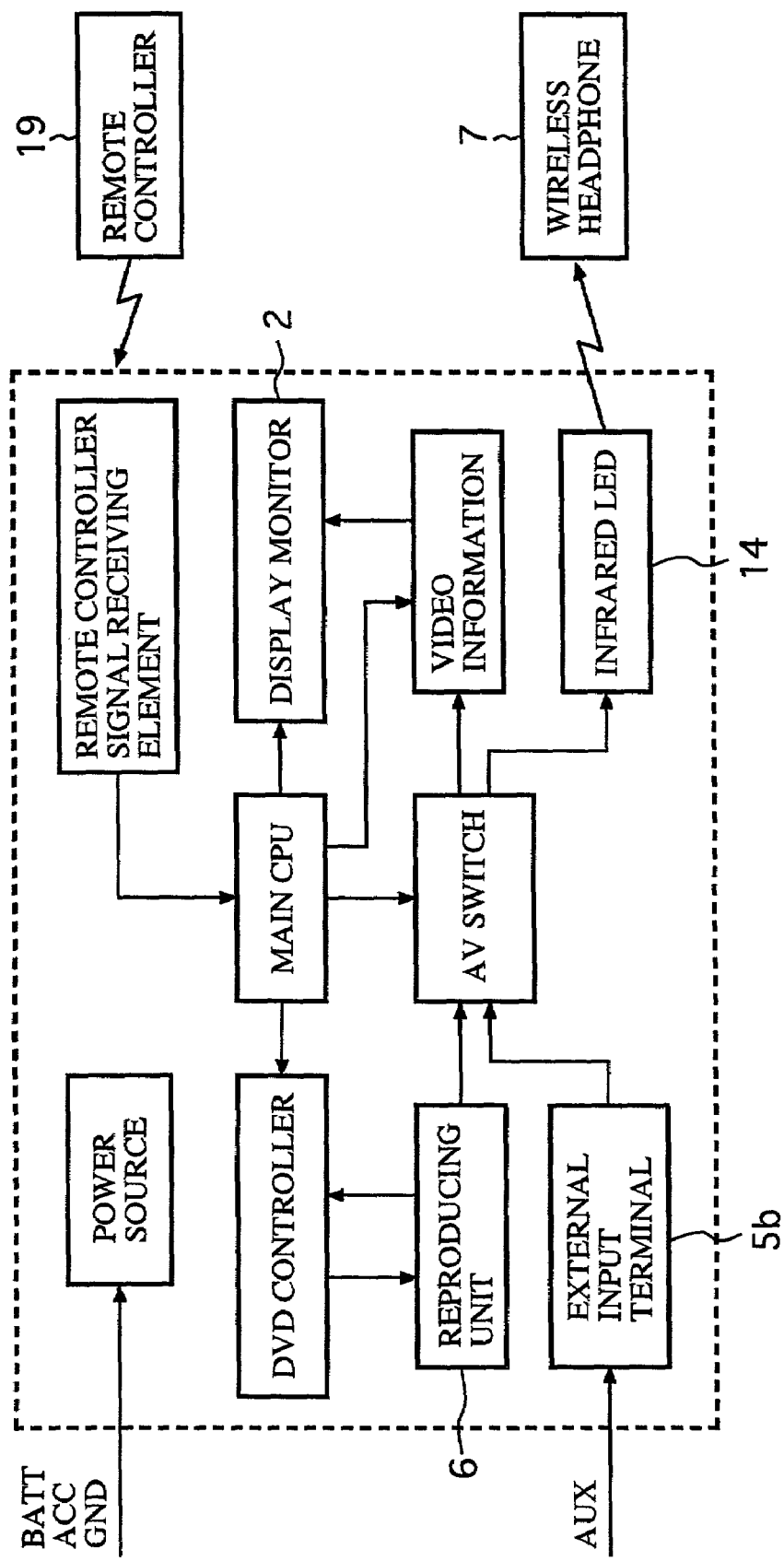

IMAGE REPRODUCING DEVICE

This application is the national phase under 35 U.S.C. 371 of PCT International Application No. PCT/JP01/06503 which has an International filing date of Jul. 27, 2001.

TECHNICAL FIELD

This invention relates to a field of video reproducing equipment which reproduces and displays video information, and in particular to a video reproducing equipment which is disposed or installed on a ceiling, or the like, inside a compartment of a vehicle. Specifically, for example, this invention relates to a video reproducing equipment for video/image recording and reproducing by utilizing a digital versatile disk (DVD) player and a liquid crystal color display, or television, video, Internet communication, or the like.

BACKGROUND ART

Conventionally, a video reproducing equipment able to house a display in a ceiling of a vehicle compartment has been known. This kind of video reproducing equipment is described in numerous documents. For example, Published Japanese Utility Model Registration Application No. 15479/1989, Published Japanese Utility Model Registration Application No. 137048/1986, and Published Japanese Patent Application No. 149083/1990 disclosed that looking and listening are enabled by opening the display downward. Published Japanese Utility Model Registration Application No. 14549/1992 disclosed that the display is arranged to be movable along the ceiling of the vehicle. Further, Published Japanese Patent Application No. 189620/1991 disclosed that the display is housed with it inclined relative to the ceiling of the vehicle.

In these conventional video reproducing equipments, while the display is disposed on the ceiling of the vehicle, the reproducing equipment for reproducing the information memory medium such as a compact disc (CD-Read Only Memory) player, a DIM player, or the like, is disposed in another place inside the vehicle compartment.

In this manner, in each of the conventional video reproducing equipments, while the display is disposed on the ceiling in the vehicle compartment, the portion for reproducing the video information to be displayed on the display load from the information memory medium, or the like, is disposed separate from the display. Therefore, a connecting equipment, or the like, via wiring or wireless means is required for connecting between the portion for reproducing the video information and the display.

In addition, the conventional video reproducing equipment do not take a unit construction inclusive of the DVD player, or the like, for reproducing the video, but a structure on a simple open/close display basis. Therefore, the entire unit inclusive of other large units becomes large in size. Particularly, it involves increase in the thickness of the elaborately designed portion at the bottom of the ceiling of the vehicle, enlargement of the projected area of disposition or installation on the ceiling of the vehicle, and deterioration of the operability of insertion and rejection of the information memory medium such as a disk, or the like.

For example, where a package is manufactured, in which large constituents such as a DVD player, or the like, other than the display are integrated, the equipment to be disposed on the ceiling of the vehicle becomes large in size. Therefore, the safe space inside the vehicle compartment is narrowed by the detriment that the visual recognition of the rear side from the driver's seat is shielded, and that the package resides within a region in which passenger's head may impact on it. In addition, the package injures the interior design decorated inside the limited vehicle compartment.

Further, in case there is provided a port for inserting thereinto and ejecting therefrom, an information memory medium such as a disc, or the like, enough clearance cannot be secured in the ceiling of the vehicle, impairing the operability of insertion and ejection into/from the disc.

Still further, since there is provided a remote controller for operating the equipment separate from the body of the equipment itself, when a user tries to use the remote controller, it is often lost, leading to have the trouble of searching it inside the vehicle compartment.

This invention has been made to solve the above problems and has an object of providing a small-sized video reproducing equipment which is superior in operability and visibility when in use, and is superior in a housing efficiency when housed.

DISCLOSURE OF INVENTION

The video reproducing equipment according to this invention having at least a pair of units and a chassis for holding the units and includes supporting means for supporting a displacement of the pair of units; and fixing means for fixing the displacement, the pair of units being displaced in respective directions and fixed and housed in a predetermined position.

According to the invention, a small-sized equipment is provided in which the operability and visibility are superior when in use, as well as the housing efficiency when housed.

In the video reproducing equipment according to the invention, preferably the pair of units is respectively disposed in an upper and lower position.

According to the invention, the disposing area of the equipment is decreased and the housing efficiency is improved when housed, minimizing the equipment.

In the video reproducing equipment according to the invention, preferably one of the pair of units is held between the other unit and the chassis to house the pair of units.

According to the invention, the pair of units is easily and efficiently housed.

In the video reproducing equipment according to the invention, preferably the pair of units uses in common the supporting means to simultaneously displace the pair of units to the predetermined position.

According to the invention, the pair of units are easily opened and closed.

In the video reproducing equipment according to the invention, in a state where the displacement of one of the pair of units is fixed in the predetermined position, preferably the other unit is independently displaced and fixed within a predetermined range.

According to the invention, the freedom of disposing the units use is improved when in.

In the video reproducing equipment according to the invention, preferably the equipment is disposed on a plane having a recessed portion, and at least part of one of the pair of units is displaced so as to receive it into the recessed portion.

According to the invention, the amount of projection of the equipment into the disposing space of the equipment is reduced and the security is improved by hiding the units.

The video reproducing equipment according to the invention, preferably further includes limiting means for limiting the range of displacement of at least one of the pair of units.

According to the invention, the equipment is displaced within a minimum range and the space is saved.

In the video reproducing equipment according to the invention, preferably the equipment to be limited and the chassis are provided, as limiting means, with a recessed portion and a projected portion.

According to the invention, the range of displacement of the equipment is limited by a simple structure.

The video reproducing equipment according to the invention, preferably further includes provisional fixing means for provisionally fixing the displacement of one of the pair of units; and releasing means for releasing the provisional fixing, the releasing means releasing the provisional fixing linked with the displacement of the other unit.

According to the invention, by displacing the other unit, the provisional fixing of one of the pair of units is released for displacement, whereby the pair of units are easily opened and closed, and housed.

In the video reproducing equipment according to the invention, preferably one of the pair of units and the chassis are provided, as provisional fixing means, with a projected portion which comes into engagement with the recessed portion, and a cam is provided, as releasing means, for releasing the fitting linked with the other unit.

According to the invention, the pair of units are easily opened and closed, and housed with a simple structure.

In the video reproducing equipment according to the invention, preferably an information memory medium or a constituent is inserted or rejected into/from at least one of the pair of units, the pair of units are displaced to a first predetermined position in which the one of the pair of units is housed and to a second predetermined position in which the information memory medium or the constituent is inserted and ejected thereinto/therefrom.

According to the invention, the insertion and ejection of the information memory medium or the constituent are facilitated and the security is improved by hiding the units through housing.

In the video reproducing equipment according to the invention, preferably the pair of units are disposed in a front and rear position.

According to the invention, the equipment is made thinner when housed and the freedom in disposition of each unit is improved when in use.

The video reproducing equipment according to the invention, preferably further implements interlocking means for interlocking the displacement of each of the pair of units, and the other unit is displaced linked with the displacement of said one of the pair of units.

According to the invention, the opening and closing as well as the housing of the pair of units become easy.

In the video reproducing equipment according to the invention, the interlocking means preferably includes interlocking releasing means for releasing the interlocking under a predetermined condition, and, in case the displacement of one of the pair of units is fixed, or in case an external force beyond a predetermined level is applied to the other unit, the other unit is independently displaced.

According to the invention, the freedom in disposing the units is improved when in use.

In the video reproducing equipment according to the invention, preferably a plurality of constituents are contained inside one of the pair of units.

According to the invention, the operability of the plurality of constituents is improved and the number of units is reduced.

The video reproducing equipment according to the invention, preferably further includes a door for covering one of the pair of units after said one of the pair of units has housed.

According to the invention, the dust-proofing and protection of the units after they have housed become possible and the security is improved by hiding the units.

The video reproducing equipment according to the invention preferably further includes a light for illuminating a space in which the equipment is disposed, and the door is disposed to shield the illuminated light within a predetermined range.

According to the invention, by limiting the illumination range of the illuminated light, the visibility is improved when looking and listening to the videos.

The video reproducing equipment according to the invention, preferably further includes a remote controller for operating the equipment, the remote controller being detachably mounted on the equipment body or one of the pair of units.

According to the invention, it saves the trouble of searching for the remote controller and easily uses the remote controller.

In the video reproducing equipment according to the invention, preferably an opening is formed such that the remote controller is operated while mounting the remote controller in position.

According to the invention, the remote controller is easily operated while mounting the remote controller in position.

In the video reproducing equipment according to the invention, one of the pair of units is a reproducing equipment for reproducing video information and the other unit is a display unit for displaying the reproduced video information thereon.

According to the invention, a small-sized video reproducing equipment is provided which is superior in operability of the reproducing equipment and in visibility of the display unit when in use, as well as in the housing efficiency when housed.

In the video reproducing equipment according to the invention, the equipment is preferably disposed on a ceiling of a vehicle compartment.

According to the invention, a small-sized video reproducing equipment for a vehicle is provided which is superior in operability and visibility when in use, as well as in the housing efficiency when housed.

BRIEF DESCRIPTION OF DRAWINGS

FIG. 41 is a functional block diagram showing the entire video reproducing equipment in embodiments of the invention.

BEST MODE FOR CARRYING OUT THE INVENTION

The best mode for carrying out this invention will now be described about the structure, operation and effect with reference to the accompanying drawings.

FIRST EMBODIMENT

Figure 1:
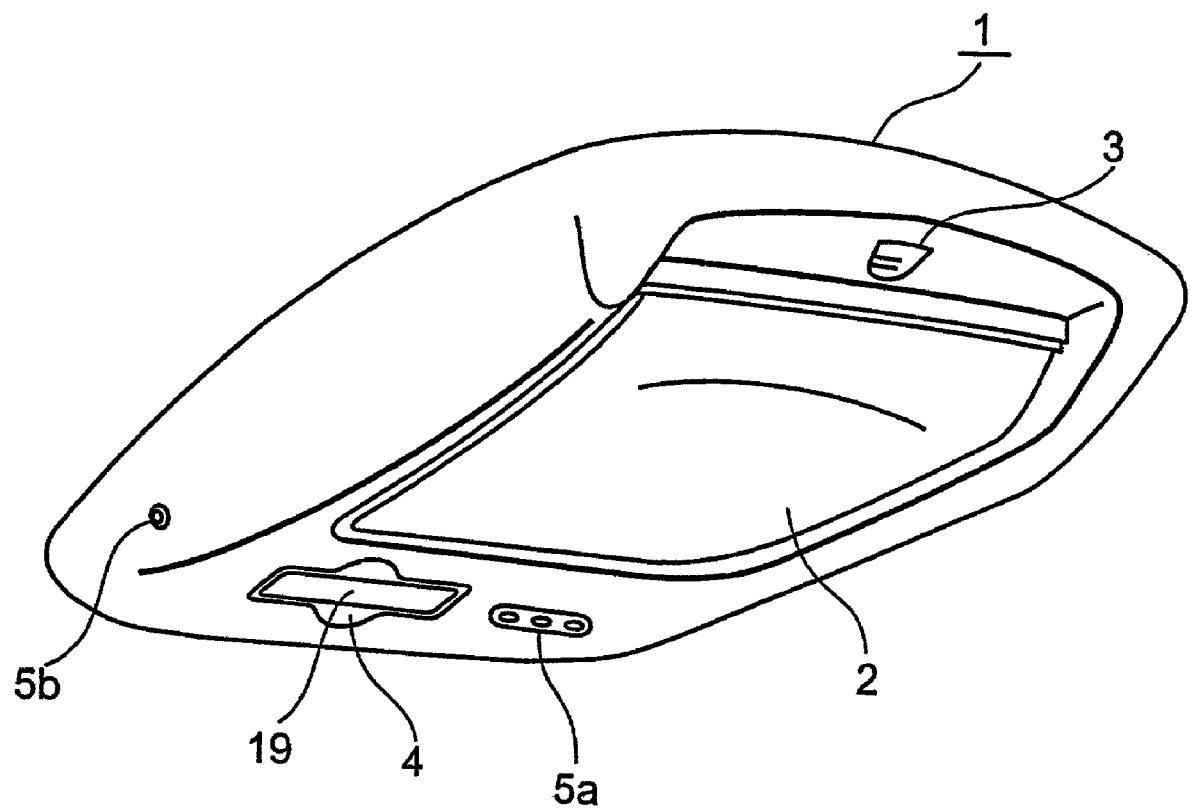
FIG. 1 is a perspective view showing an external view of a video reproducing equipment according to a first embodiment of the invention.
Figure 2:
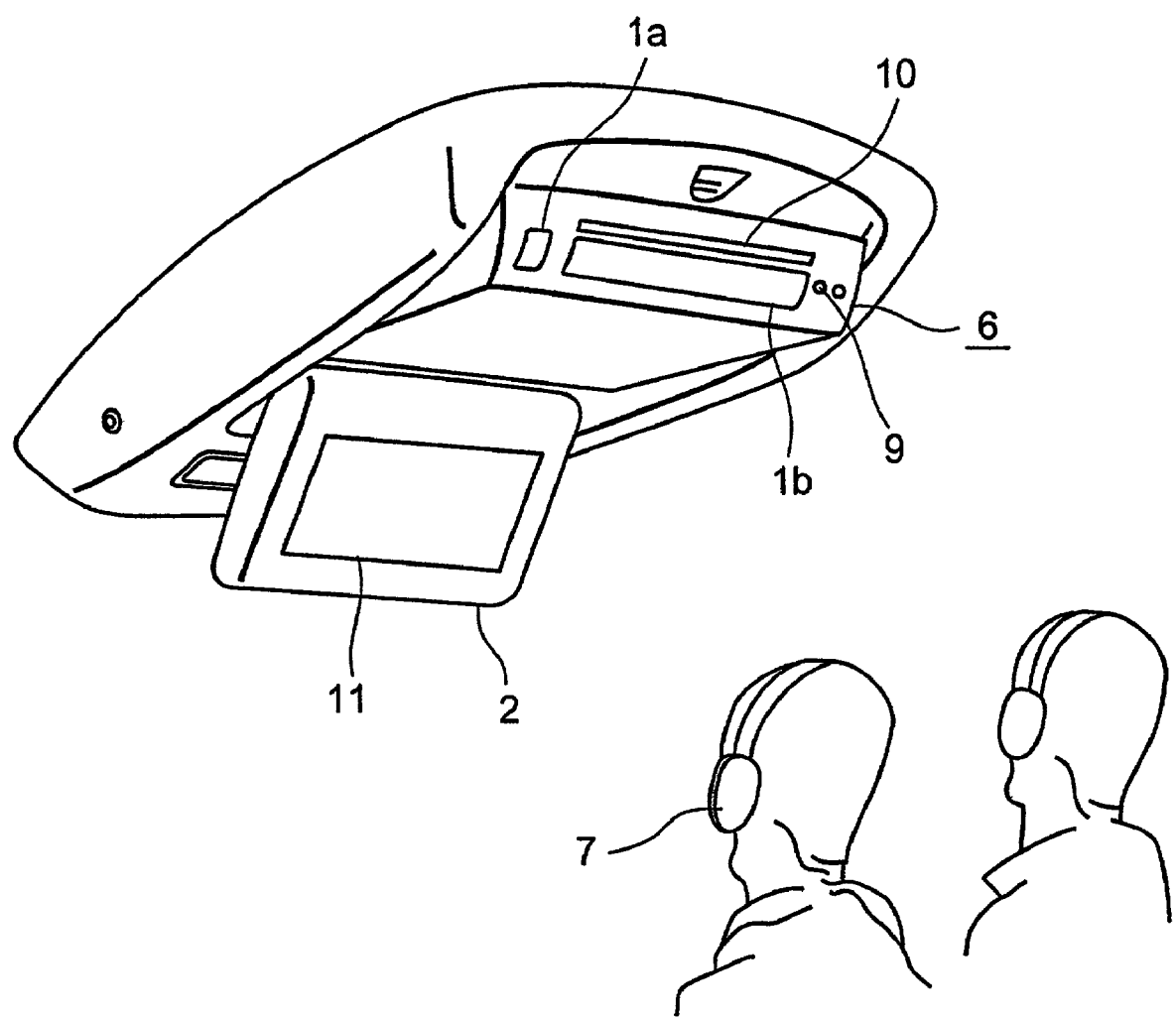
FIG. 2 is a perspective view showing a state in which a display monitor 2 and a reproducing unit 6 of the video reproducing equipment in a first embodiment are opened.

FIG. 1 is a perspective view showing an external view of a video reproducing equipment according to the first embodiment. FIG. 2 is a perspective view showing a state in which a display monitor 2 as a display unit and a reproducing unit 6 of the video reproducing equipment in the first embodiment are opened. FIG. 41 is a functional block diagram showing the entire video reproducing equipment in the embodiment.

The video reproducing equipment in the first embodiment is disposed on a ceiling of a vehicle compartment. FIG. 1 shows a state in which the display monitor 2 is closed. When an open/close button 3 is pushed in this state, the display monitor 2 and the reproducing unit 6 for a DVD player, or the like, are opened as shown in FIG. 2 to bring a user seated on a rear seat in the vehicle into a state ready for looking videos and listening to sounds, respectively.

On a bottom surface of a body base cover 1, headphone output terminals 5a are provided. As means for listening to the sounds, aside from the method of listening to them by coupling connection terminals to the headphone output terminals 5a, there are several ways as shown in the followings. The first way is to listen to the sounds by converting the sound signals to, e.g., infrared or radio frequency signals (RF signals), or the like, to wirelessly transmit them to the wireless headphone(s) 7 worn by the user(s). On a side surface of the body base cover 1, an external input terminal 5b is provided, so that the second way is connect it to an external source such as a game device, a video camera, or the like, to look and listen to it.

A remote controller housing 4 for housing a detachable remote controller 19 for operating the equipment body is disposed in the rear of the display monitor 2, so that the third way is to eject the housing 4 when the remote controller 19 is in use, or to house the housing 4 therein when it is not in use.

Figure 3:
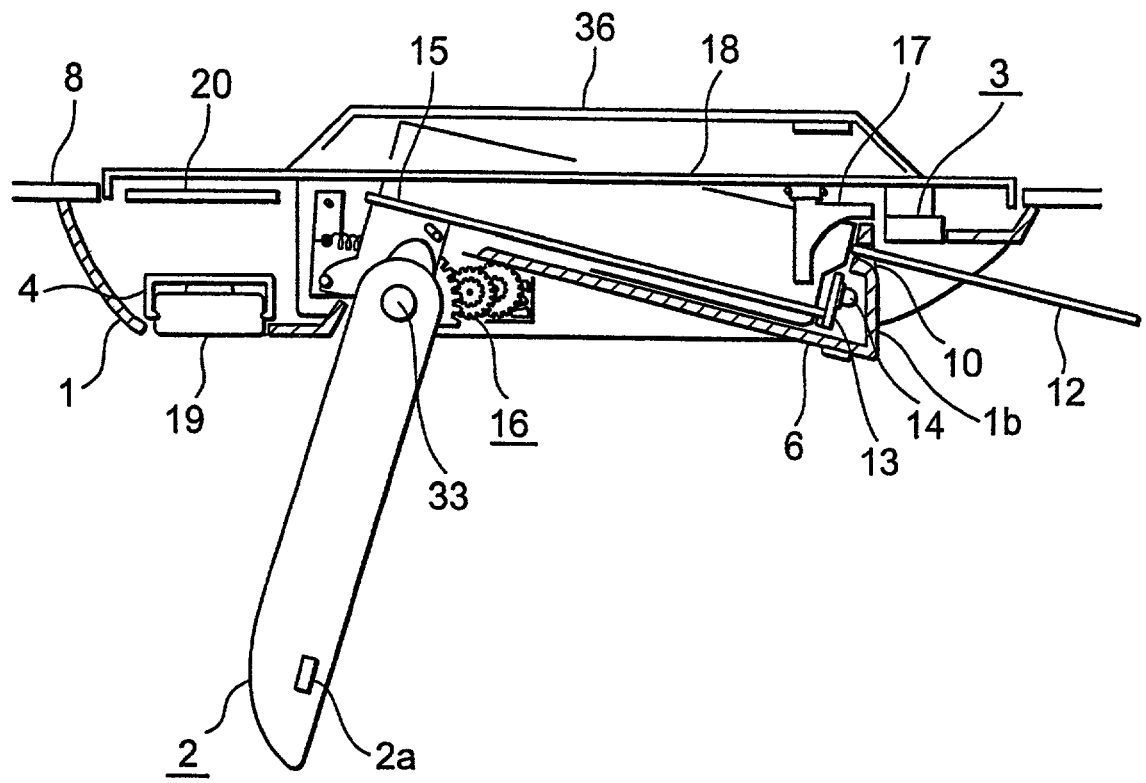
FIG. 3 is a side view showing an overall structure of the video reproducing equipment of a first embodiment.

FIG. 3 is a side view showing the entire structure of the video reproducing equipment in the first embodiment, which shows a state in which the display monitor 2 and the reproducing unit 6 are opened. The display monitor 2 and the reproducing unit 6 are disposed in an upper and lower position with a common shaft 33 as supporting means for supporting the rotation of each. A frame chassis 18 has provided therein a shaft holder 16 and holds the display monitor 2 and the reproducing unit 6. The frame chassis 18 has a top cover 36 in a projected shape with respect to a recessed portion on the rear side of a ceiling 8 of the vehicle so as, when the reproducing unit 6 is closed, to rotate the whole or a part of the reproducing unit 6 to the ceiling 8 of the vehicle and to house either of the reproducing unit 6 therein. Further, in the front portion of the reproducing unit 6, the open/close button 3 is provided for opening and closing as well as open/close lock claws 17 as a lock mechanism as locking means. The reproducing unit 6 is fixed to a unit deck holder 15 and rotates together with the rotation of the unit deck holder 15.

In the front surface of the reproducing unit 6, a front-portion electric circuit board 13 is disposed, on which surface-mounted switches for operating a body operating button 1a, a display light emitting diode (LED) 9, receiving elements for receiving remote controller signals, or the like. Further, an infrared LED 14 is also surface-mounted for transmitting the sound signals. The sound signals thus converted into infrared rays are transmitted through a translucent panel 1b to the wireless headphone 7 worn by the user. In addition, in the rear of the equipment body, there is disposed a main electric circuit board 20 on which a power circuit, video/sound circuits, communication circuits, and their connectors are surface-mounted.

Figure 4:
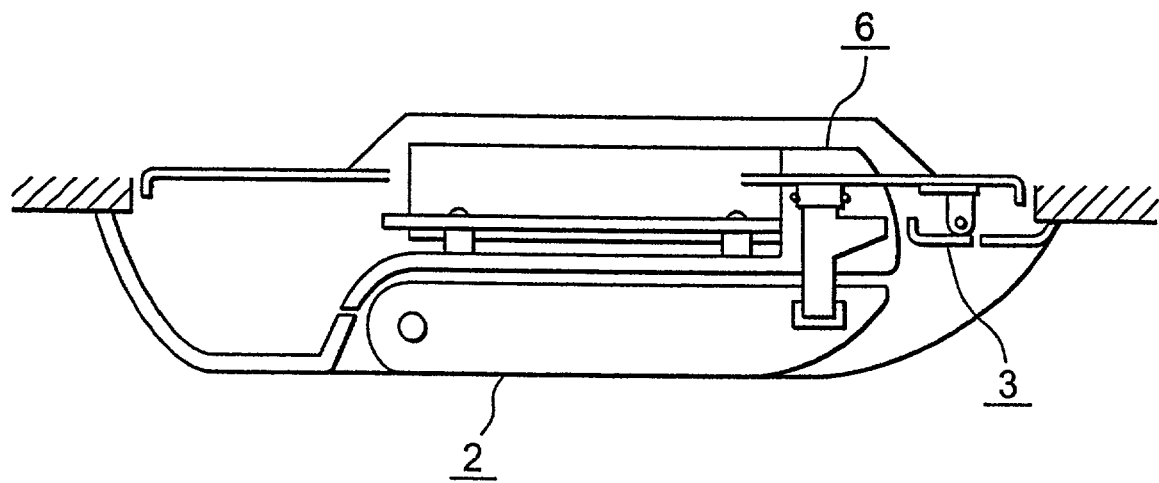
FIG. 4 is a side view showing a state in which the display monitor 2 and the reproducing unit 6 of the video reproducing equipment in a first embodiment are closed.
Figure 5:
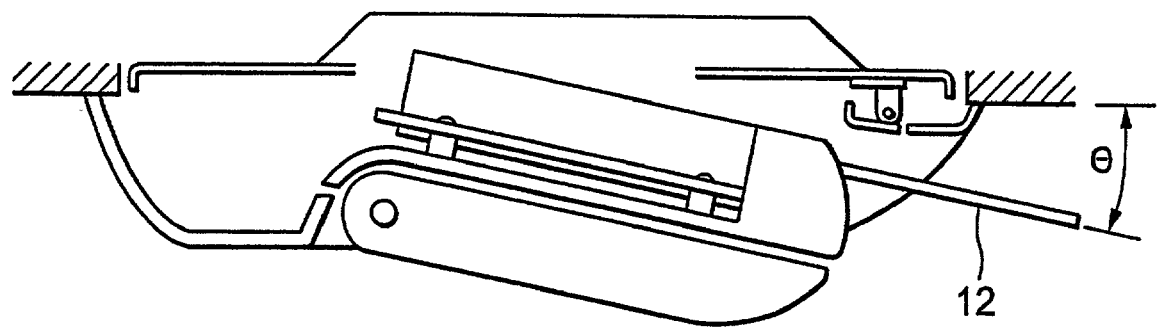
FIG. 5 is a side view showing a state in which the reproducing unit 6 of the video reproducing equipment of a first embodiment is opened to a predetermined inclination angle.
Figure 6:
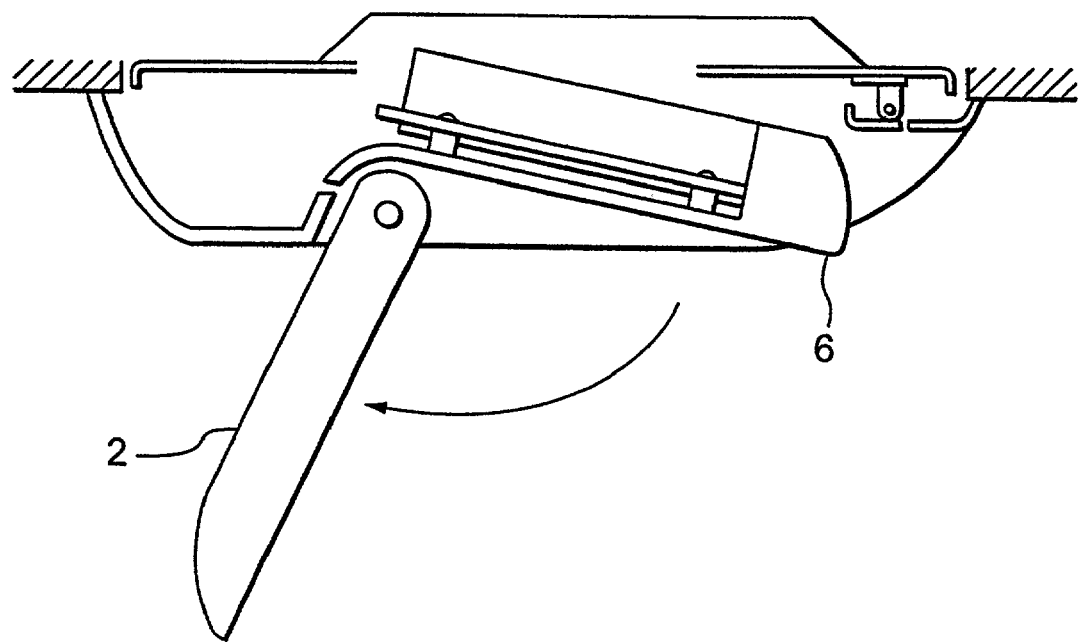
FIG. 6 is a side view showing a state in which the display monitor 2 of the video reproducing equipment of a first embodiment is opened to a predetermined inclination angle.

FIGS. 4 through 6 are sectional side views showing each stage from, the state in which the body of the video reproducing equipment in the first embodiment is closed to the state in which it is opened. When the open/close button 3 is pushed in the closed state in FIG. 4, the display monitor 2 and the reproducing unit 6 are simultaneously opened and are fixed at a predetermined inclination angle θ as shown in FIG. 5. In this situation, a disk inserting port 10 of the reproducing unit 6 looks downward from the ceiling 8 of the vehicle by the inclination angle θ and, as a result, the insertion and rejection into/from a disc 12 as the information memory means becomes possible.

At the moment the reproducing unit 6 rotated and fixed, the display monitor 2 is able to rotate further by the moment of inertia slightly away from the reproducing unit 6 and stop there. By manually pushing open the display monitor 2 from this state, there will be a state in which the user can look and listen to the video on a screen 11 as shown in FIG. 6.

Figure 7:
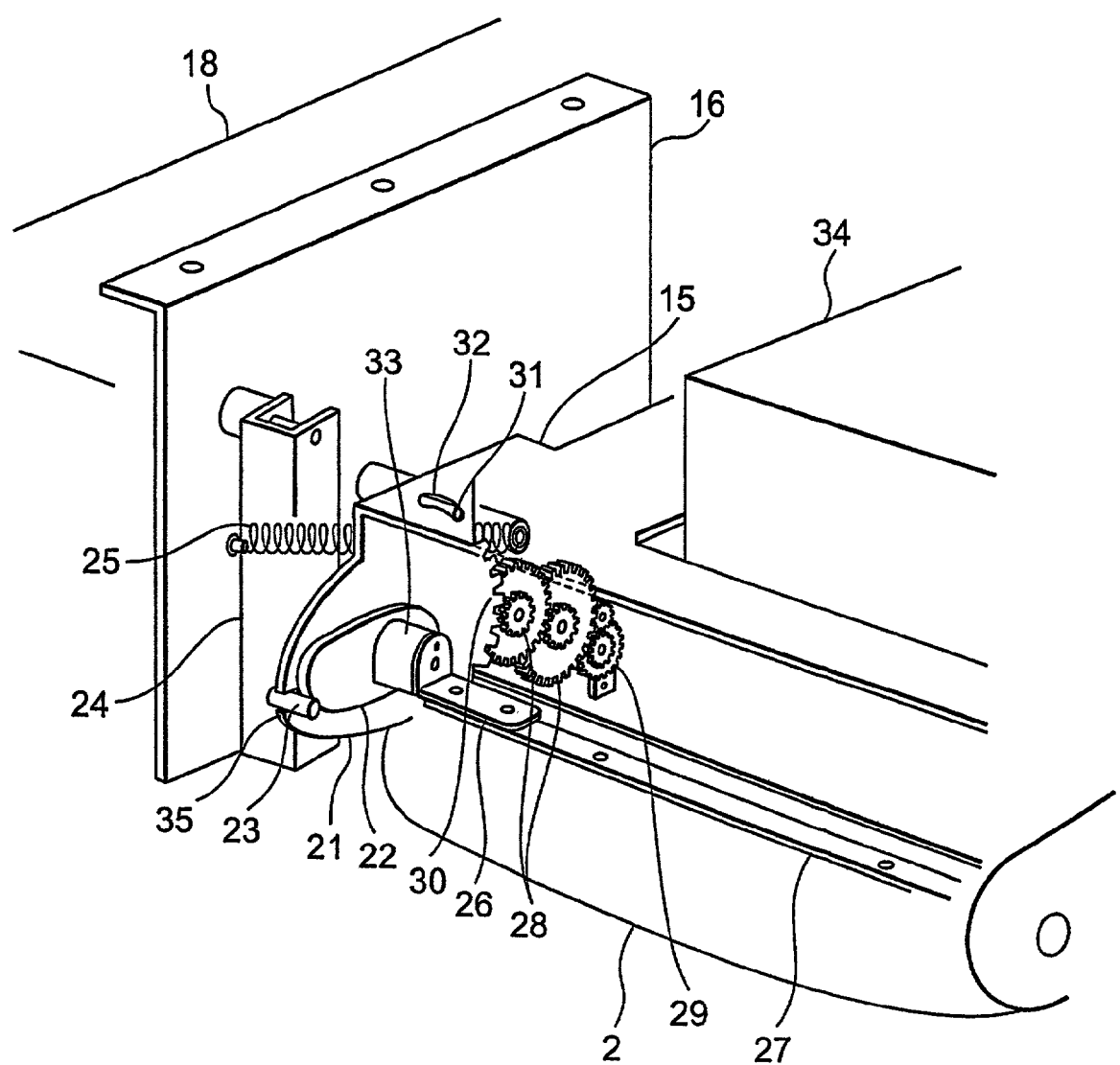
FIG. 7 is a perspective view showing a structure of a shaft in a first embodiment.

FIG. 7 is a perspective view showing the structure of the shaft of the video reproducing equipment in the first embodiment. A shaft for the unit deck holder 15 and that for the display monitor 2 lie in a coaxial shaft 33. In the shaft of the unit deck holder 15, a rotary hook fixing, cam 21 is formed as provisional fixing means. A rotary hook releasing cam 22 as releasing means is mounted on the coaxial shaft 33 of the display monitor 2. The rotary hook fixing cam 21 has formed therein a rotary hook groove 35 as a fitting recessed portion, and a fixing pin lever 24 having a fixing pin 23 as a fitting projecting portion for fitting with the fitting recessed portion is mounted on a shaft holder 16. This fixing pin lever 24 is disposed such that the fixing pin 23 is urged against the rotary hook fixing cam 21.

The unit deck holder 15 is provided with a deck holder gear 30. A rotation restricting portion is configured with rotation transmitting gears 28 and a damper 29, for restricting the rotation, geared with each, other. In addition, in order to prevent the reproducing unit 6 from inclining, due to rotation, beyond a predetermined open/close angle from the ceiling 8 of the vehicle, there is provided an inclination limiter mechanism made of an inclination limiter pin 31 and an inclination limiter hole 32 as a projected portion and a recessed portion, respectively, engaging with each other as limiting means.

The structure of the shaft as shown in FIG. 7 maybe provided both in the right and left sides of the shaft 33.

Figure 8:
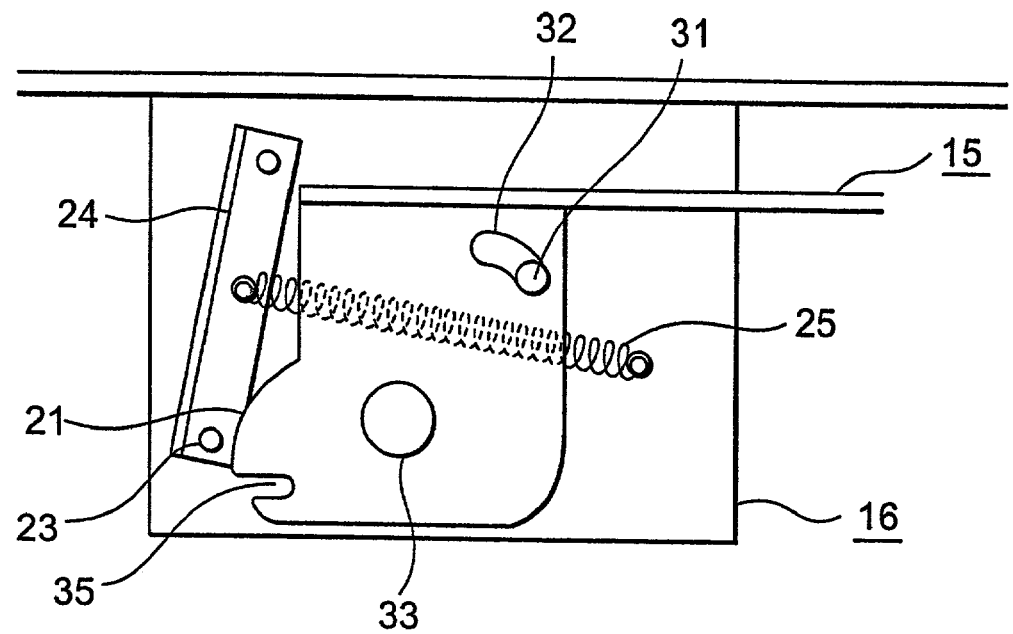
FIG. 8 is a side view showing the structure of a shaft in a first embodiment.
Figure 9:
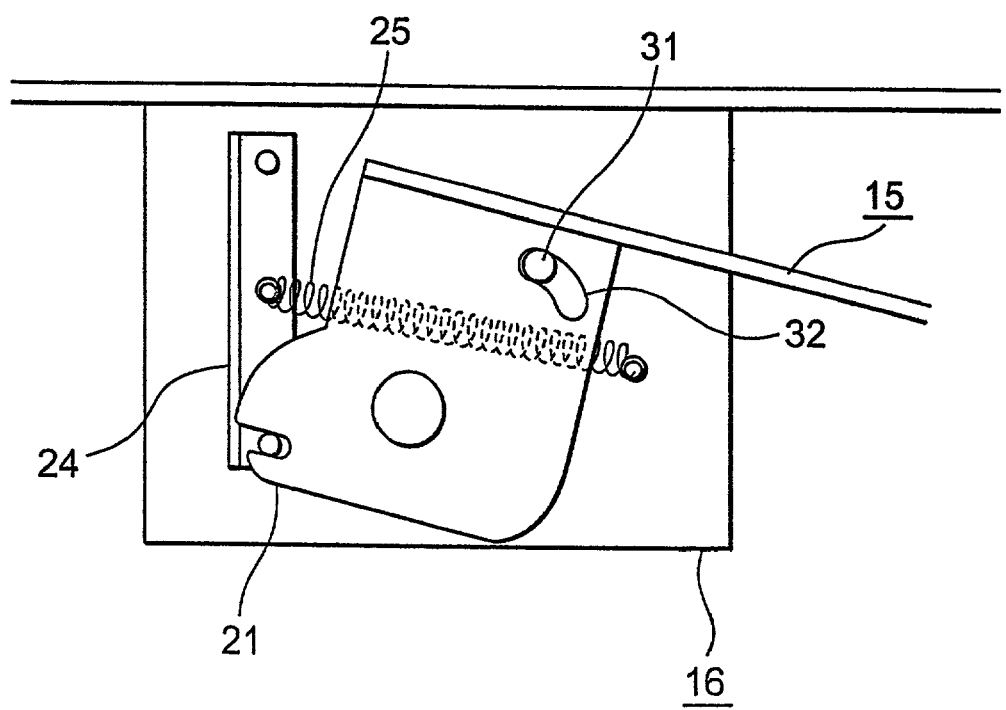
FIG. 9 is a side view showing the structure of a shaft in a first embodiment.

FIGS. 8 and 9 are side views showing the structure of the shaft of the video reproducing equipment in the first embodiment, which show the motion of the rotary hook mechanism at the time the unit deck holder 15 is rotated.

In a state in which the reproducing unit 6 is housed into the equipment body as shown in FIG. 8, the rotary hook fixing cam 21 is lifting the fixing pin 23, and the inclination limiter pin 31 is positioned in the lower limit of the inclination limiter hole 32.

When the reproducing unit 6 opens while rotating the unit deck holder 15 as shown in FIG. 9 and inclines to the predetermined inclination angle, the fixing pin 23 gets fit into the rotary hook groove 35, fixing the inclination angle. At this time, the inclination limiter pin 31 is positioned near an upper limit of the inclination limiter hole 32. The inclination angle is determined by the fixing pin 23, and the inclination limiter pin 31 functions as a safety device when an abnormal moment of rotation is applied.

Figure 10:
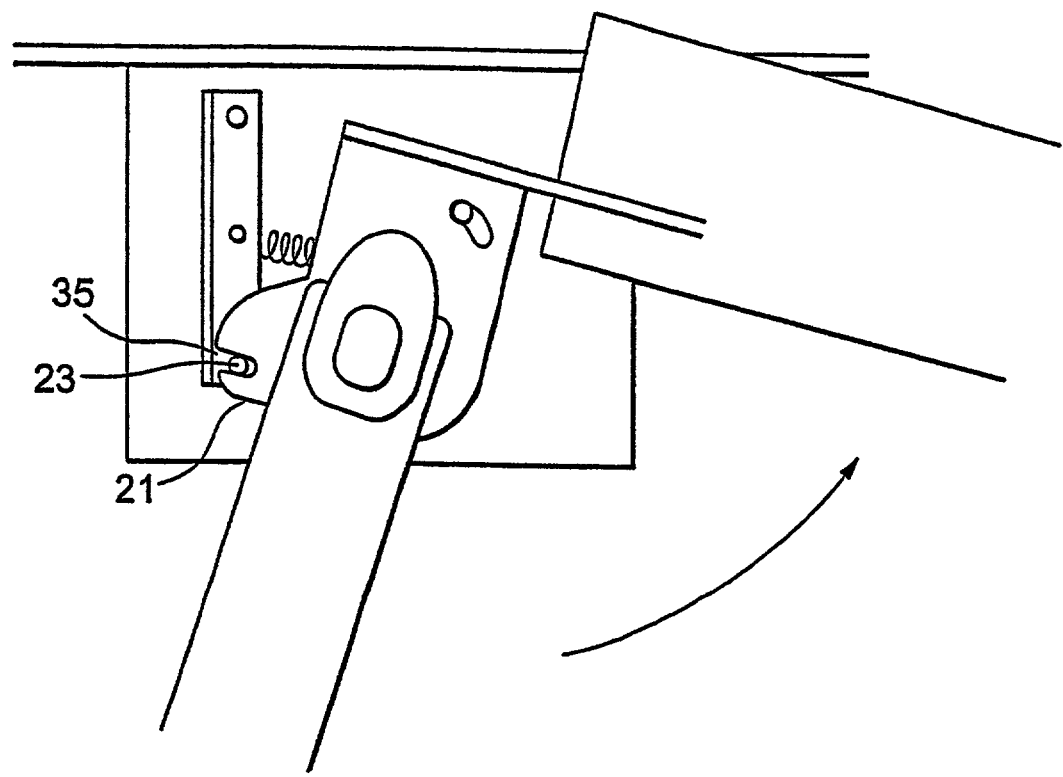
FIG. 10 is a side view showing the structure of a shaft in a first embodiment.
Figure 11:
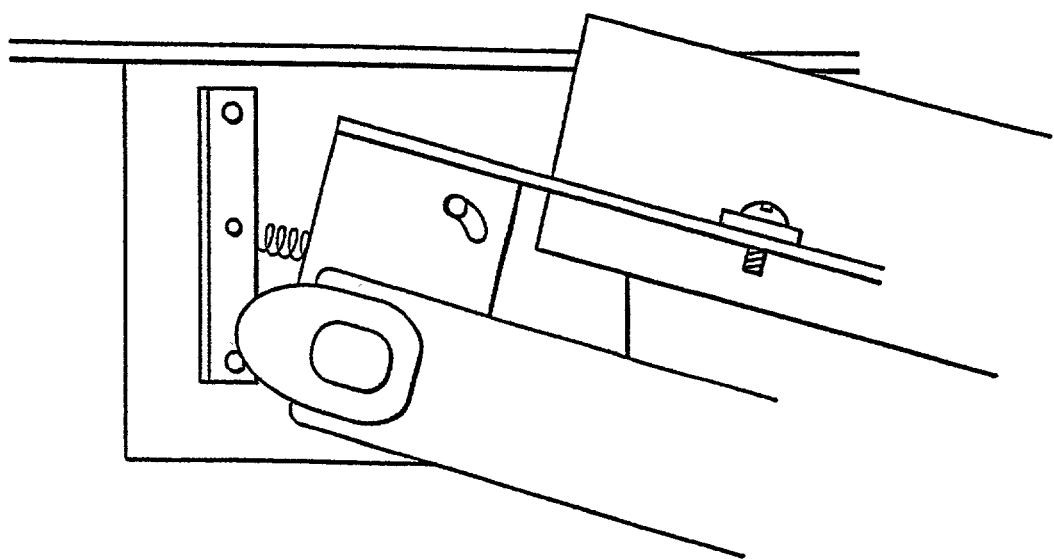
FIG. 11 is a side view showing the structure of a shaft in a first embodiment.
Figure 12:
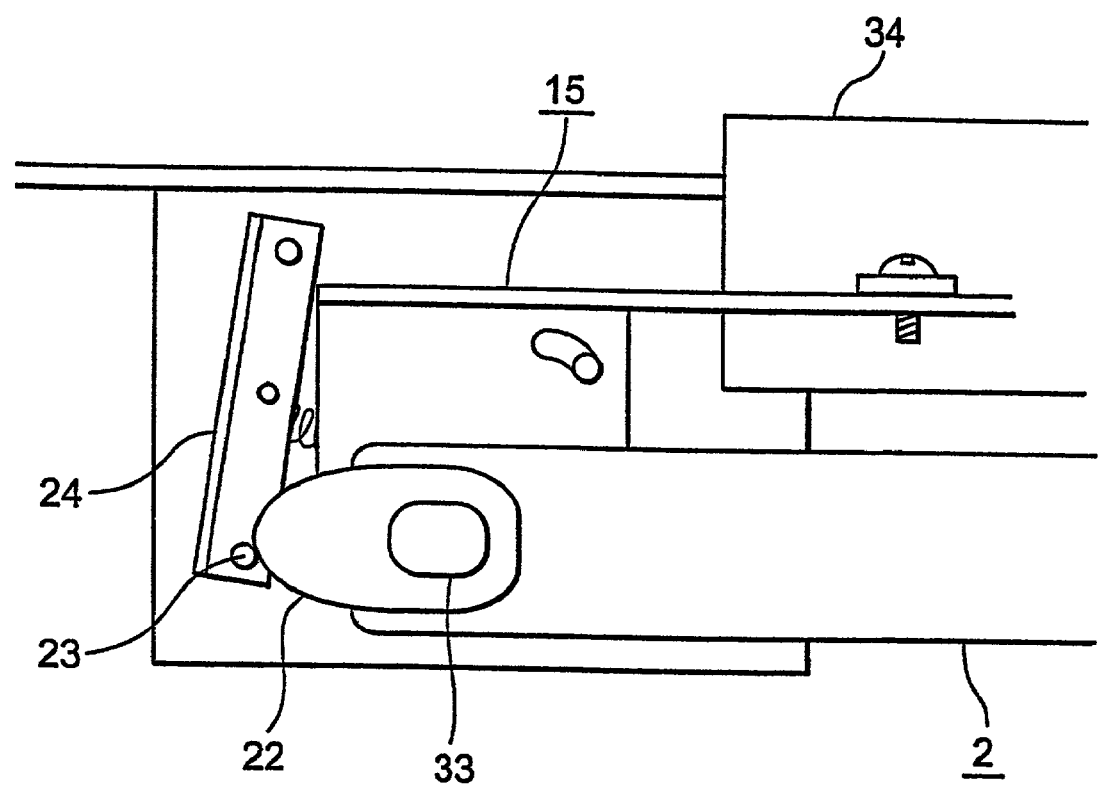
FIG. 12 is a side view showing the structure of a shaft in a first embodiment.

FIGS. 10 through 12 are side views showing the structure of the shaft of the video reproducing equipment in the first embodiment, which show the motion of the rotary hook releasing cam 22 which disengages the fixing pin 23 from the rotary hook groove 35 in closing the opened display monitor 2. FIG. 10 shows a state in which the display monitor 2 is opened when in use. FIG. 11 shows a state in which the display monitor 2 is closed and is just before coming into contact with the reproducing unit 6. FIG. 12 shows a state in which the display monitor 2 and the reproducing unit 6 have completely closed. It is so arranged that, in FIG. 11 and FIG. 12, the rotary hook releasing cam 22 operates on the fixing pin 23 to release the fixing of the hook.

Figure 13:
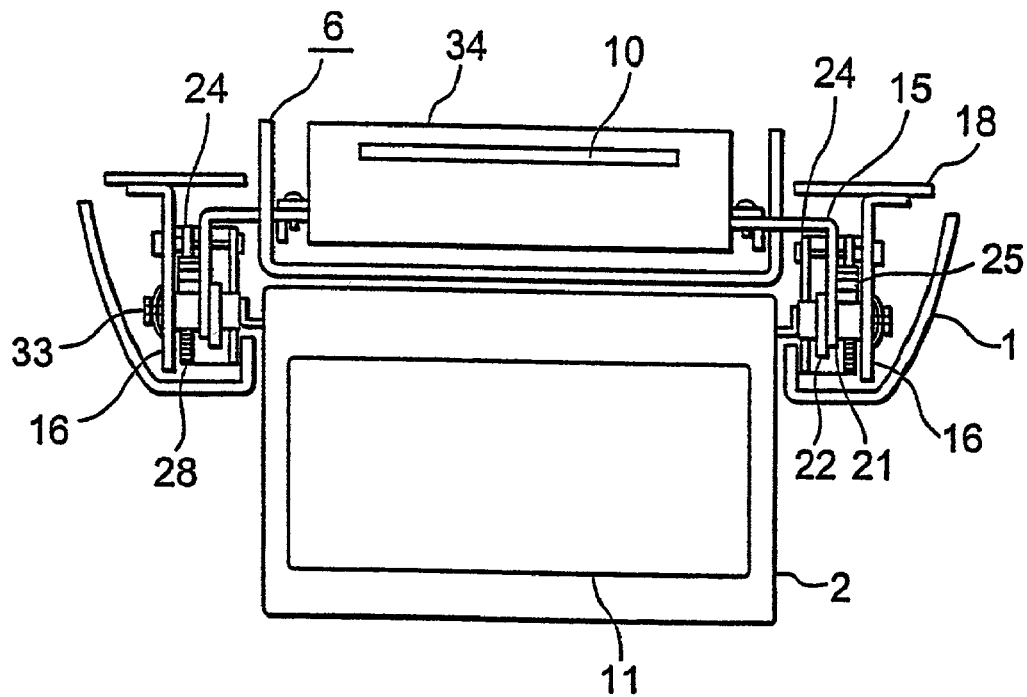
FIG. 13 is a front view showing an overall structure of the shaft in a first embodiment.

FIG. 13 is a sectional view, as seen from the front of the equipment body, of an overall structure of the shaft of the video reproducing equipment in the first embodiment. In this example, on both right and left sides of the shaft, rotary hook mechanisms 21-25 and inclination limiter mechanisms 31-32 are disposed, and the rotation braking portion 28-30 is disposed only on the left shaft.

Figure 14:
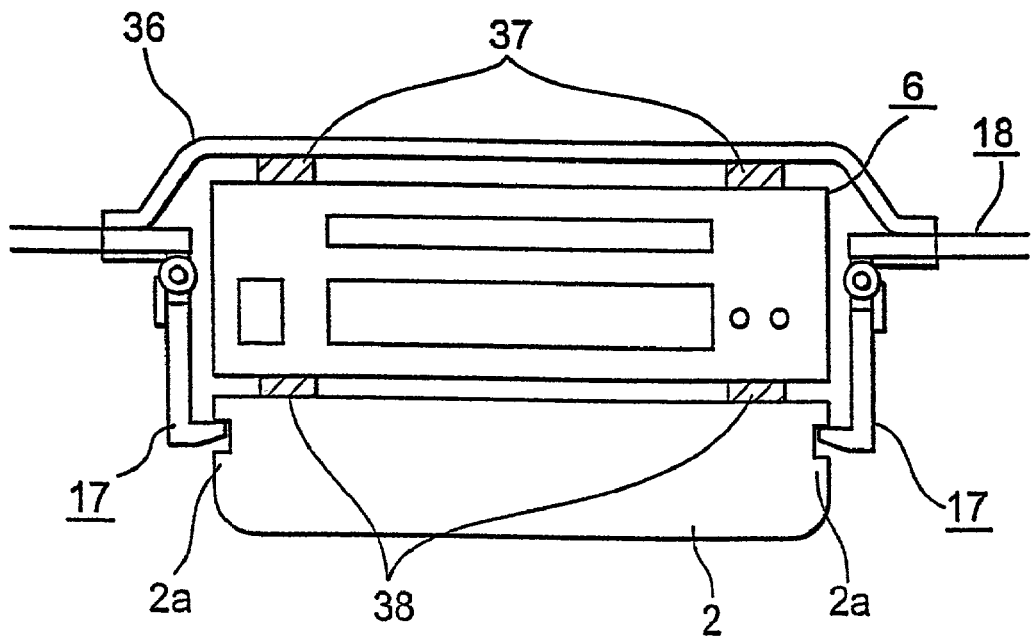
FIG. 14 is a front view showing an overall structure of an open/close mechanism in a first embodiment.

FIG. 14 is a front view showing the structure of the open/close mechanism in the video reproducing equipment in the first embodiment. It shows a state in which, with the equipment body closed, the reproducing unit 6 is being sandwiched by the equipment body, chassis and the display monitor 2 as a result of positioning of the open/close lock claws 17 which form the open/close mechanism in recessed portions 2a in the display monitor. On upper and lower portions of the reproducing unit 6, deck-holding cushions 37 and display monitor-holding cushions 38 are disposed, respectively, so that the displacement of the reproducing unit 6 due to shocks and vibrations can be prevented.

Figure 15:
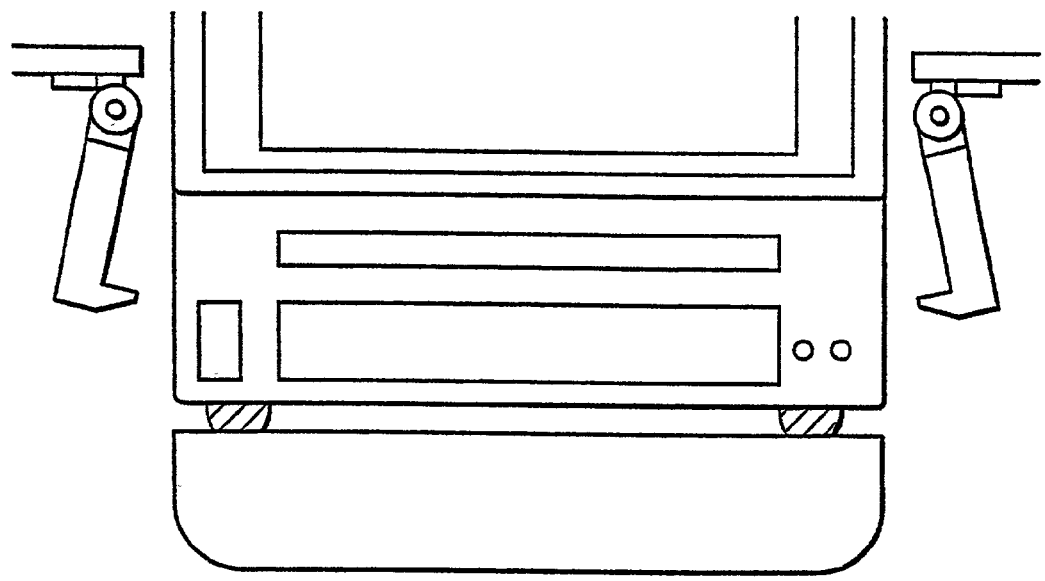
FIG. 15 is a front view showing a state in which the open/close lock claw 17 is out of engagement in a first embodiment.

FIG. 15 is a front view showing a state in which the open/close lock claws 17 are released and the reproducing unit 6 and the display monitor 2 is opened while rotating and lowering them in the first embodiment.

Figure 16:
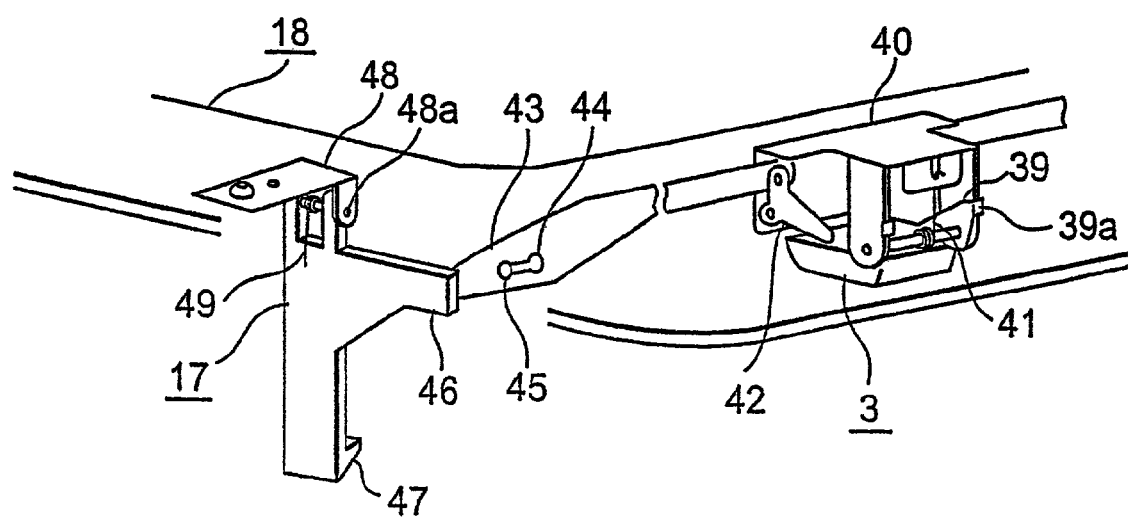
FIG. 16 is a perspective view showing the structure of the open/close mechanism in a first embodiment.
Figure 17:
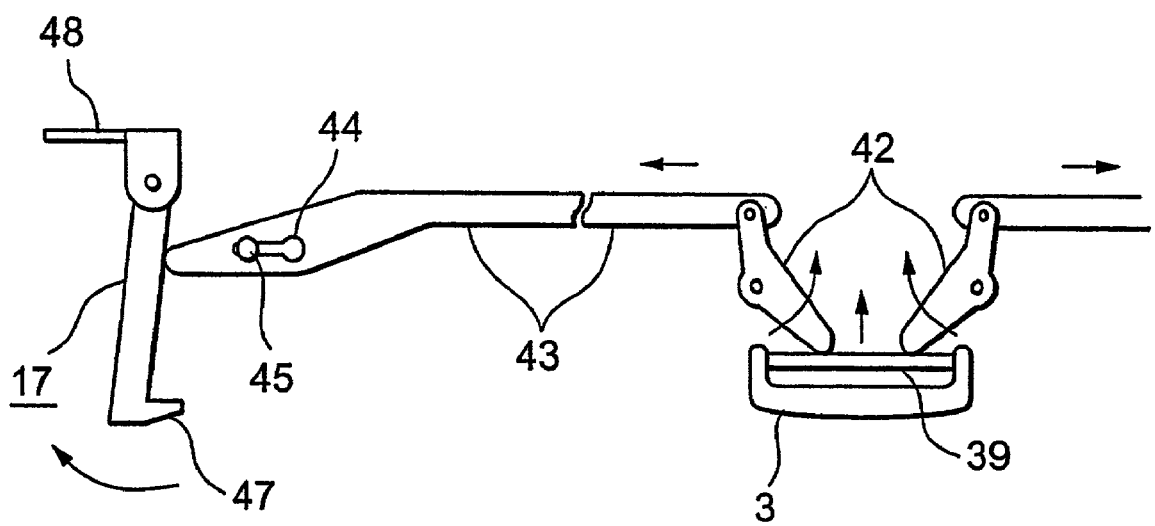
FIG. 17 is a front view showing the operation of the open/close mechanism in a first embodiment.

FIGS. 16 and 17 are a perspective view and a front view, respectively, showing the structure and operation of the open/close mechanism of the video reproducing equipment in the first embodiment. The open/close mechanism is positioned under the frame chassis 18 and, in FIG. 16, the top cover 36 is drawn in a transparent manner. FIG. 17 shows the movement in which the open/close lock claw 47 is released when the open/close button 3 is pressed.

The open/close button 3 is fit into a button holder 39. The button holder 39 is urged downward as viewed in FIG. 16 by a disposed spring 41 and is aligned by abutting a claw 39a against a button base 40. In the button base 40 button levers 42 are symmetrically disposed in the right and left. The front ends of the button levers 42 are in contact with the surface of the button holder 39. On the other end of each button lever 42, one end of a slider bar 43 is coupled.

Each of the slider bars 43 is formed, at a position appropriately away from the button lever 42, a slider pin hole 44 for engagement with a slider pin 45 which is fixed to the frame chassis 18. The other end of the slider bar 43 is in contact with a slider receiving surface 46 which is a constituent of he open/close lock claw 17. Each of the open/close lock claws 17 has a fulcrum of movement in a position above the slider receiving surface 46 and is arranged so as to be rotatable in the right and left direction as viewed in FIG. 17, with a shaft 48a of an open/close lock claw holder 48 fixed to the top cover 36 as a fulcrum.

A spring 49 urges each of the open/close lock claws 17 inward where the display monitor 2 is located, and the slider receiving surface 46 urges subsequently the slider bar 43 toward the direction where the open/close button 3 is located. It is thus so arranged that there occurs no rattling between the slider receiving surface 46 and the slider bar 43 as well as between the button lever 42 and the button holder 39.

The open/close lock claws 17 are symmetrically disposed in the right and left positions so as to face each other, and the button lever 42 which operates thereon, as well as the slider bar 43, the slider pin hole 44 and the slider pin 45 as the slider mechanism are also symmetrically disposed in the right and left positions in corresponding therewith.

Taking such arrangements, when the open/close button 3 is pushed as shown in FIG. 17, the slider bar 43 pushes the slider receiving surface 46 substantially horizontally by the slider mechanism of the slider pin hole 44 and the slider pin 44. The open/close lock claws 17 rotates outward, so that the open/close lock claws 47 get out of engagement with the display monitor recessed portions 2a.

In FIG. 14, recessed portions (not shown) similar to the recessed portions 2a in the display monitor may be formed in right and left sides of the reproducing unit 6 so that, in the open state as shown in FIG. 15, the above recessed portions of the reproducing unit 6 are fixed by the open/close lock claws 17. In this event, by fixing the recessed portions at positions sufficiently away from the shaft 33, the inclination angle of the reproducing unit 6 can be held when opened and fixed with a high accuracy.

Next, FIGS. 18 through 22 show a housing structure for the remote controller 19 of the video reproducing equipment in the first embodiment.

Figure 18:
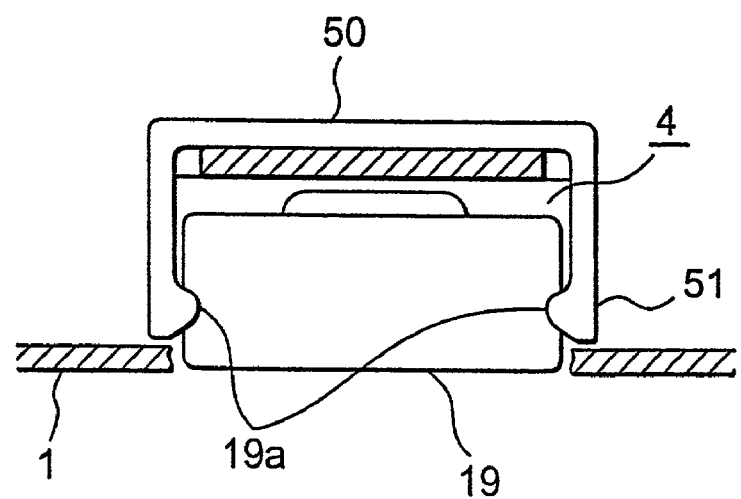
FIG. 18 is a sectional view of a remote controller housing 4 in a first embodiment.
Figure 19:
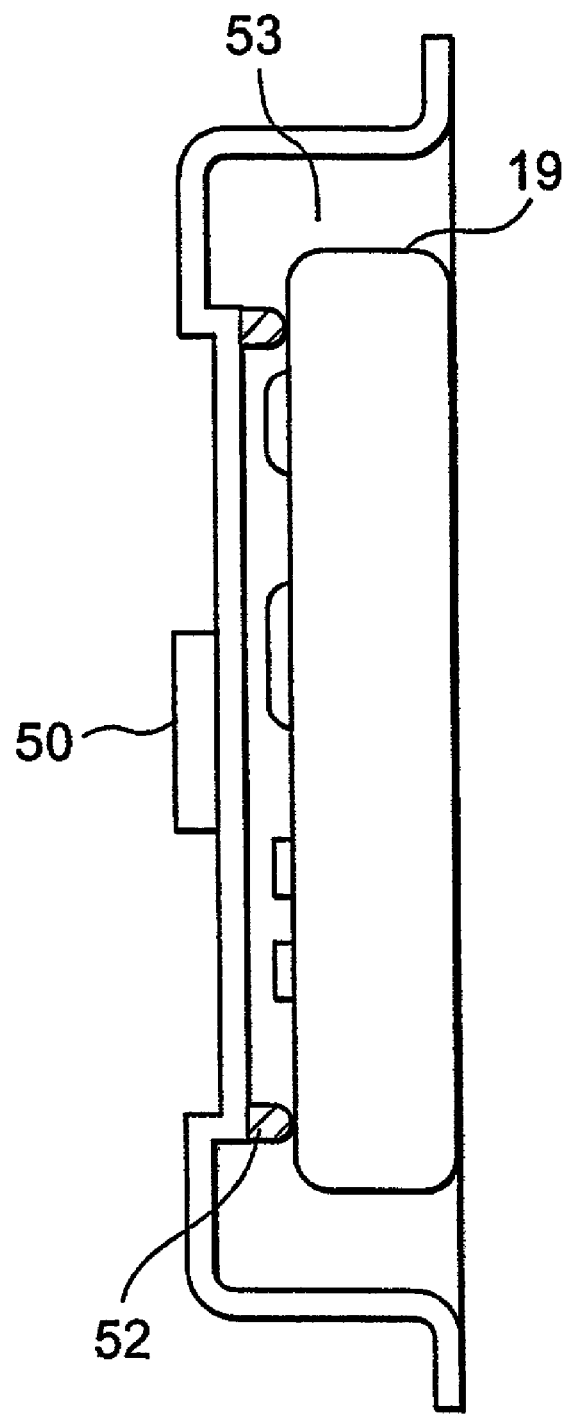
FIG. 19 is a longitudinal sectional view of the remote controller housing 4 in a first embodiment.
Figure 20:
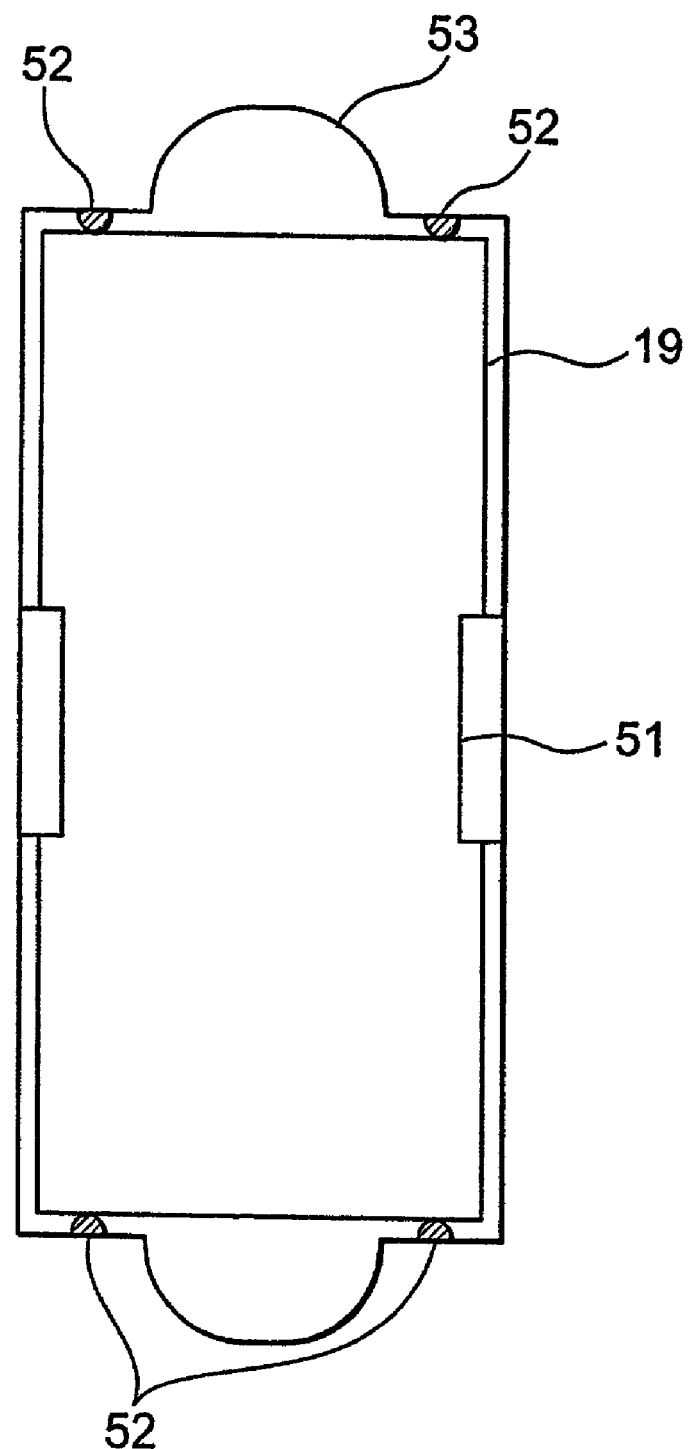
FIG. 20 is a bottom view of the remote controller housing 4 in a first embodiment.

FIGS. 18 through 20 are a sectional view, a longitudinal sectional view and a bottom view, respectively, of the remote controller housing 4, which show the state in which the remote controller 19 is mounted on the remote controller housing 4. In this example, the remote controller holding portion is configured as an independent member separated from the body base cover 1. Remote controller holding claws 51 are disposed at a front end of a remote controller holder 50 so that the remote controller 19 is housed and held by engaging with engaging recessed portions 19a formed in the remote controller 19. In case the remote controller 19 is rejected, fingers are inserted into remote controller output ports 53 which are formed adjacent to the remote controller 19.

It does not matter whichever surface the operating buttons of the remote controller 19 may face the inside or the outside of the body base cover 1. In this example, they are disposed on the inside so that a clearance to the operating buttons can be formed, and guide projections 52 are disposed to prevent the rattling of the remote controller 19 over the entire circumference thereof.

Figure 21:
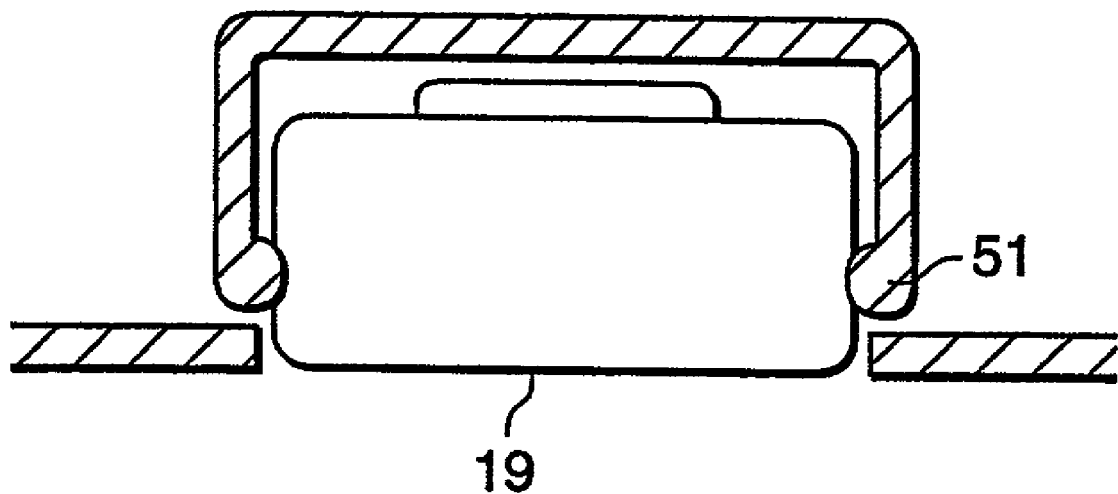
FIG. 21 is a sectional view showing a modification of the remote controller housing 4 in a first embodiment.
Figure 22:
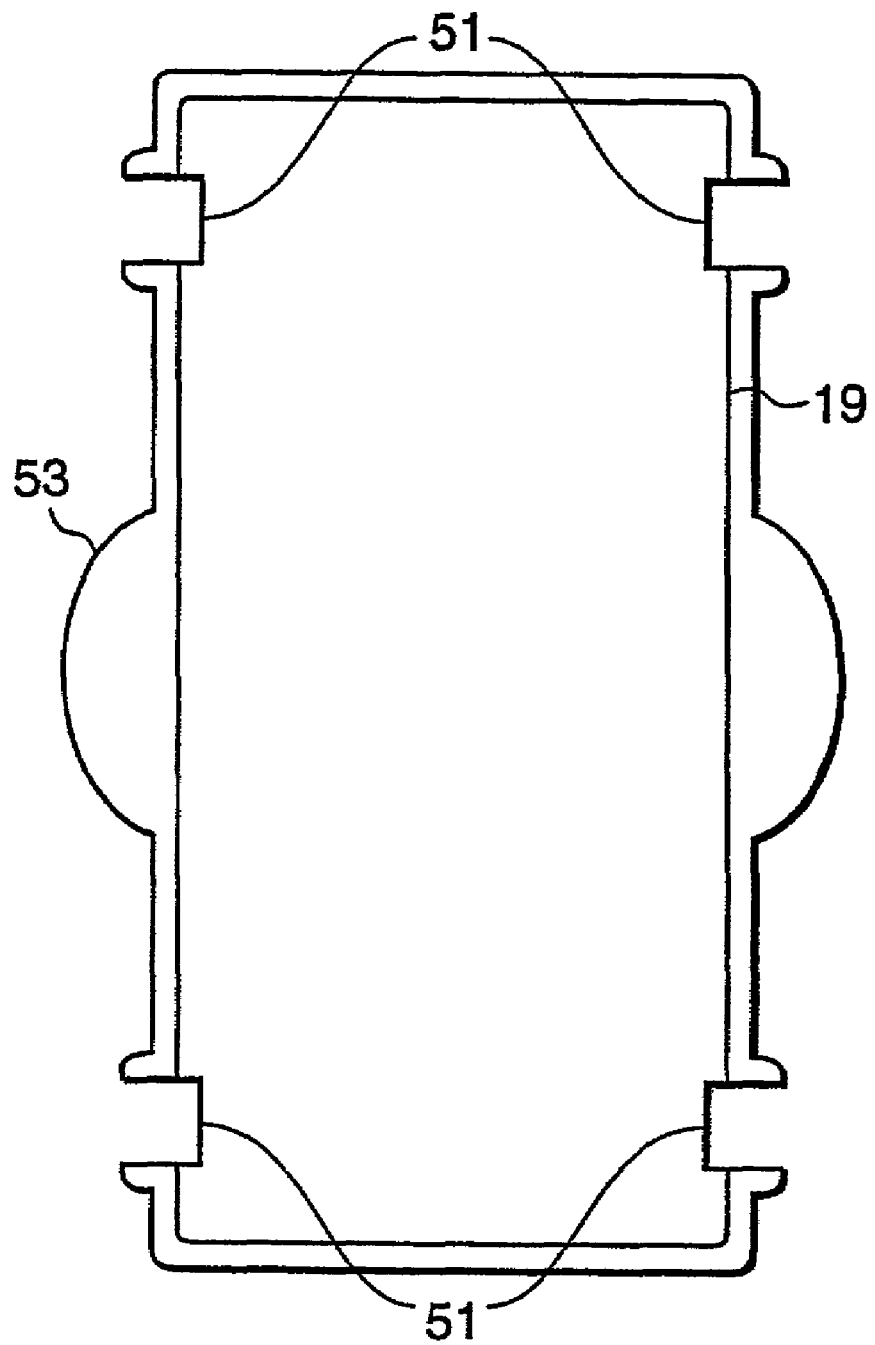
FIG. 22 is a bottom view showing a modification of the remote-controller housing 4 in a first embodiment.

FIGS. 21 and 22 are a sectional view and a bottom view, respectively, showing a modification of the housing structure for the remote controller 19 and showing a state in which the remote controller holding portion is configured integral with the body base cover 1. As for the positional relationship between the remote controller holding claws 51 and the remote controller output ports 53, as well as the number of the remote controller holding claws 51, a plurality of claws may be disposed as shown in FIG. 22 and the remote controller output ports 53 on the same plane.

In this manner, according to the video reproducing equipment of the first embodiment, since the equipment is disposed on the ceiling 8 of the vehicle such that the rotating movement and the fixing to the predetermined position and the housing of the reproducing unit 6 and the display monitor 2 are facilitated, there is provided a small-sized video reproducing equipment for a vehicle which is superior in the operability and visibility when in use as well as in the housing efficiency when housed.

Further, according to the first embodiment, since the display monitor 2 and the reproducing unit 6 are disposed in an upper and lower position, the area for the equipment body occupying the ceiling 8 of the vehicle becomes small, leading the packaging of the equipment body to a compact body.

Further, according to the first embodiment, by simply fixing the open/close claws 17 of the display monitor 2 which is disposed on the lower side, the reproducing unit 6 on the upper side can be fixed with the frame chassis 18 and it sandwiched, resulting in a simple open/close mechanism.

Still further, according to the first embodiment, since the shaft 33 of the display monitor 2 and the reproducing unit 6 is disposed on the same axis so that the display monitor 2 and the reproducing unit 6 are placed in a vertically overlapped relationship, both the units are rotated in a body and are easily opened and closed. In addition, the structure responsible for rotation, fix and release of the inclination angle, and housing of both the units are integrated and simplified.

Further, according to the first embodiment, a structure has taken in which, after the reproducing unit 6 is rotated and fixed at a predetermined angle, the display monitor 2 is further rotated to an arbitrary or a predetermined angle for fixing thereat. Therefore, the disposition of the display monitor 2 at the time of looking and listening to the video is freely changed and the visibility is improved.

Further, according to the first embodiment, a structure has taken in which the reproducing unit 6 inclusive of the disc inserting port 10 goes into the rear-side recessed portion of the ceiling 8 of the vehicle, and in which the reproducing unit 6 is rotated so that the disc inserting port 10 looks downward below the ceiling 8 of the vehicle. This makes easy the insertion and rejection into/from the disc 12 and smaller the thickness of the elaborately designed portion decorated at the bottom of the ceiling 8 of the vehicle.

Still further, according to the first embodiment, in a state in which the reproducing unit 6 and the display monitor 2 are closed and housed, the entire equipment is hidden, improving security.

Still further, according to the first embodiment, as a means for limiting the open/close angle of the reproducing unit 6, there i s formed an inclined limiter hole 32 along the circumference with the shaft 33 as the center, and is disposed an inclined limiter pin 31 which is engaged therewith. This allows rotation of the reproducing unit 6 within the smallest range, saving a space. In addition, even when an abnormal moment of rotation is applied, unnecessary rotation can be restricted.

Further, according to the first embodiment, the reproducing unit 6 is fixed at a predetermined angle by means of the structure having the fixing pin 23 and recessed groove 35 for the rotary hook which comes into engagement with the fixing pin 23. In addition, since the rotary hook releasing cam 22 for disengaging the fixing pin 23 is disposed on the shaft of the display monitor 2, by rotating the display monitor 2, the fixing of the reproducing unit 6 can simultaneously be released for rotation. This enables easy opening and closing of the units as well as housing.

Further, according to the first embodiment, the open/close mechanism by the coaxial rotation prevents from being occurred radial displacement between the display monitor 2 and the reproducing unit 6 with the result that the alignment becomes easy.

Still further, according to the first embodiment, by disposing the remote controller housing 4 for housing the remote controller 19 in position, the user is free from the trouble of searching for the remote controller 19 and is able to use it by rejecting it any time.

SECOND EMBODIMENT

Next, as the second embodiment, an example is given in which the display monitor 2 and the reproducing unit 6 are disposed in the front and rear (back and forth) position on a plane. FIGS. 23 through 30 show the structure of the video reproducing unit in the second embodiment.

Figure 23:
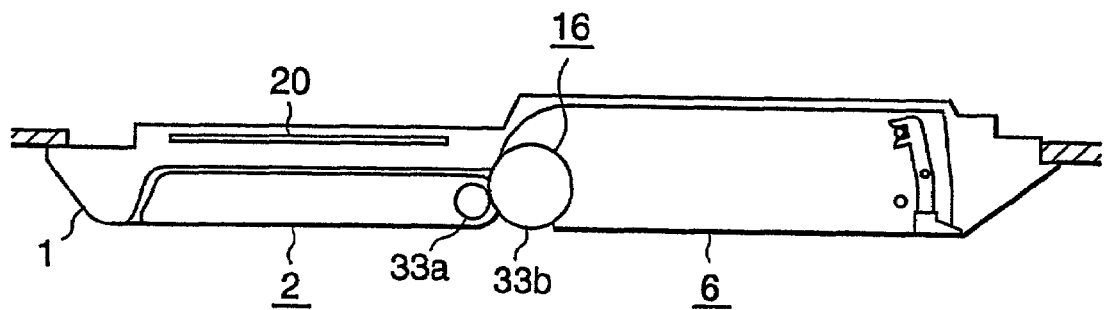
FIG. 23 is a side view showing an overall structure of the video reproducing equipment in a second embodiment of the invention.

FIG. 23 is a side view showing the entire structure of the video reproducing unit in the second embodiment. In this example, the shaft of the display monitor 2 and the shaft of the reproducing unit 6 are disposed close to each other. In a state in which the equipment is closed, the surface of the display screen 11 of the display monitor 2 faces outside of the body base cover 1.

Figure 24:
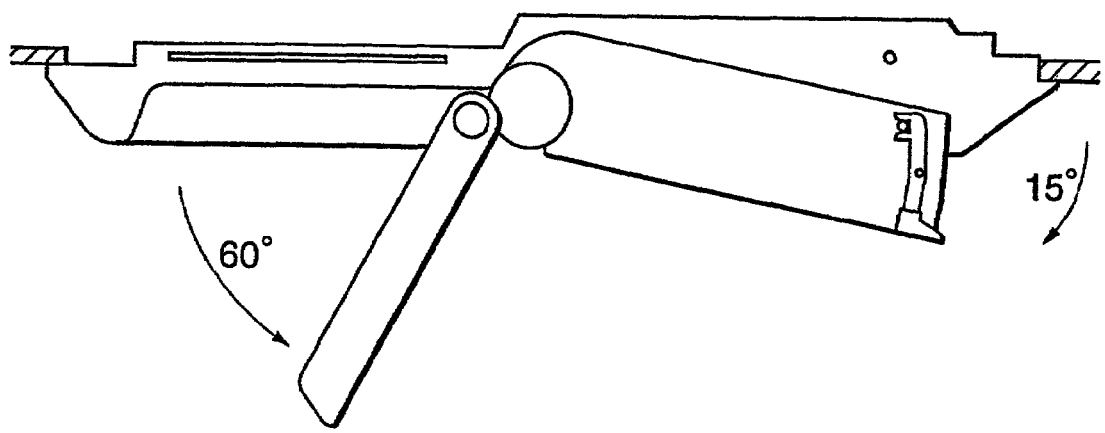
FIG. 24 is a perspective view showing a state in which a display monitor 2 and a reproducing unit 6 of the video reproducing equipment in a second embodiment are opened.

FIG. 24 is a side view showing a state in which the display monitor 2 and the reproducing unit 6 of the video reproducing unit in the second embodiment are opened. As shown in FIG. 24, a structure has taken in which, when the equipment is opened, the display monitor 2 and the reproducing unit 6 are erected by reversely rotating each other. For example, in the case of FIG. 24, when the reproducing unit 6 is opened to an angle of inclination of 15°, the display monitor 2 is opened up to an angle of inclination of 60°.

FIGS. 25 through 28 show the structure of the shaft which is provided with an interlocked rotating mechanism as interlocking means which rotates linked with each other and, when one of the two, e.g., the reproducing unit 6 is rotated, the other, i.e., the display monitor 2 is rotated linked with the rotation of the former.

Figure 25:
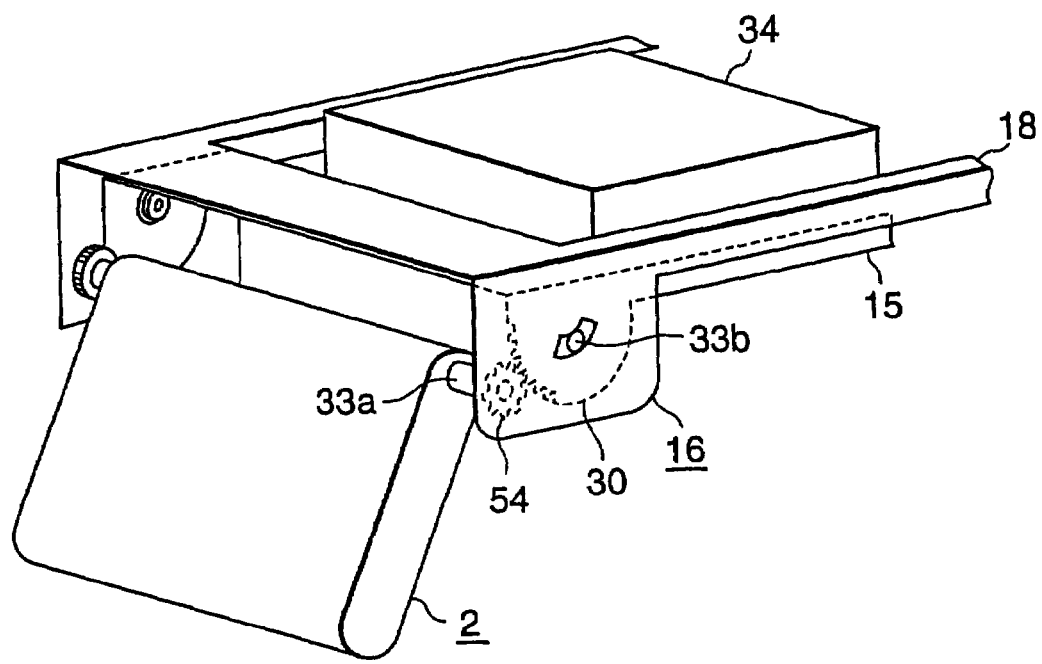
FIG. 25 is a perspective view showing the shaft in a second embodiment.
Figure 26:
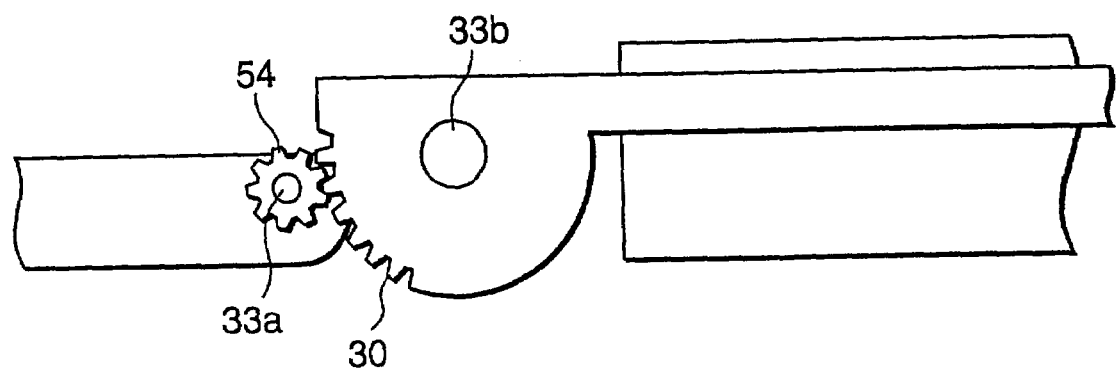
FIG. 26 is a side view showing the shaft in a second embodiment.

FIGS. 25 and 26 are a perspective view and a side view, respectively, showing the shaft in the second embodiment. The display monitor 2 and the reproducing unit 6 have independent shafts 33a, 33b. They are respectively provided with a gear on the display side and a gear 30 on the deck holder so as to be geared each other in a predetermined gear ration.

As shown in FIG. 24, in order to rotate the display monitor 2 to an angle of inclination of 600 when the reproducing unit 6 has opened to an angle of inclination of 15°, the gear ratio may be set to 1:4.

Figure 27:
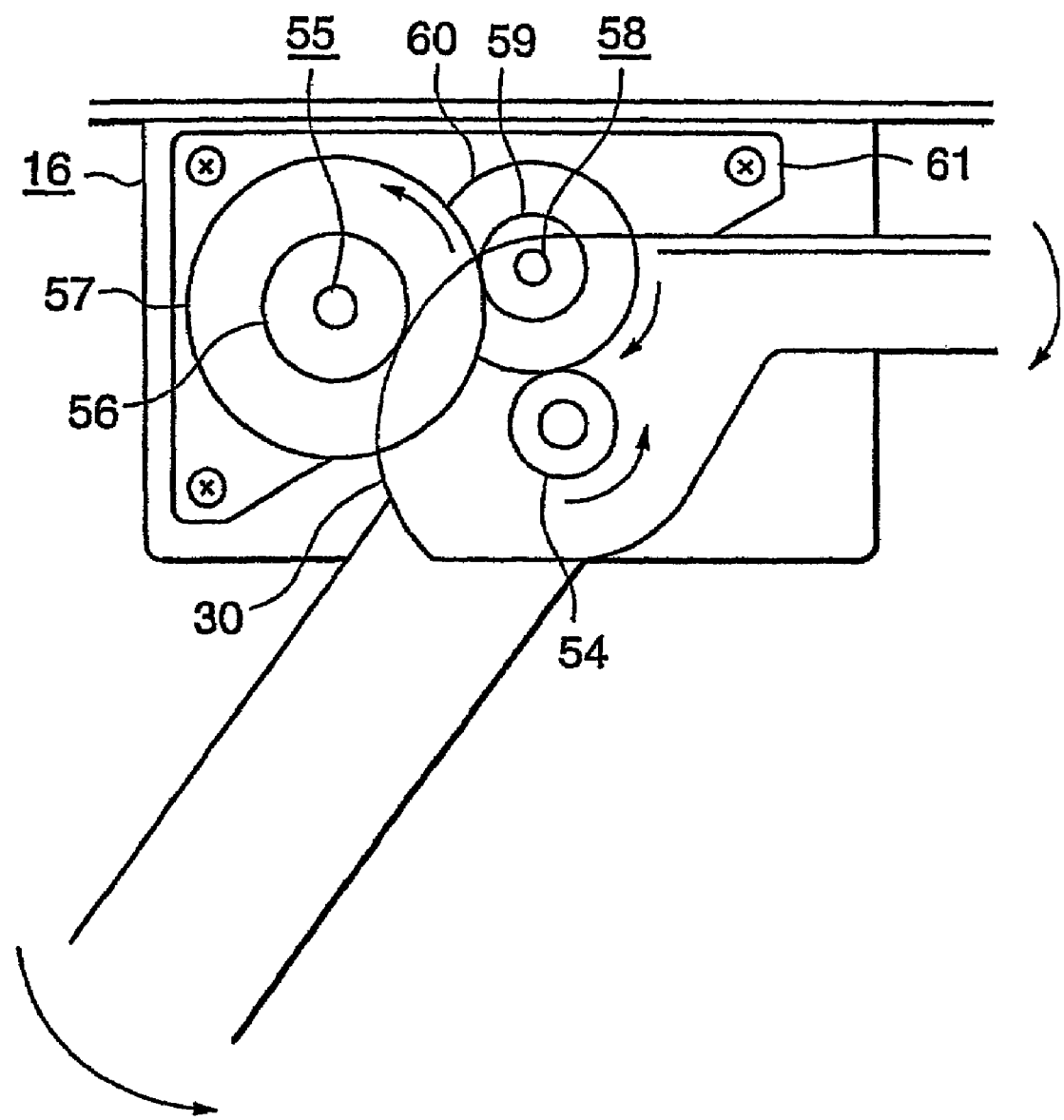
FIG. 27 is a side view showing a modification of the shaft in a second embodiment.
Figure 28:
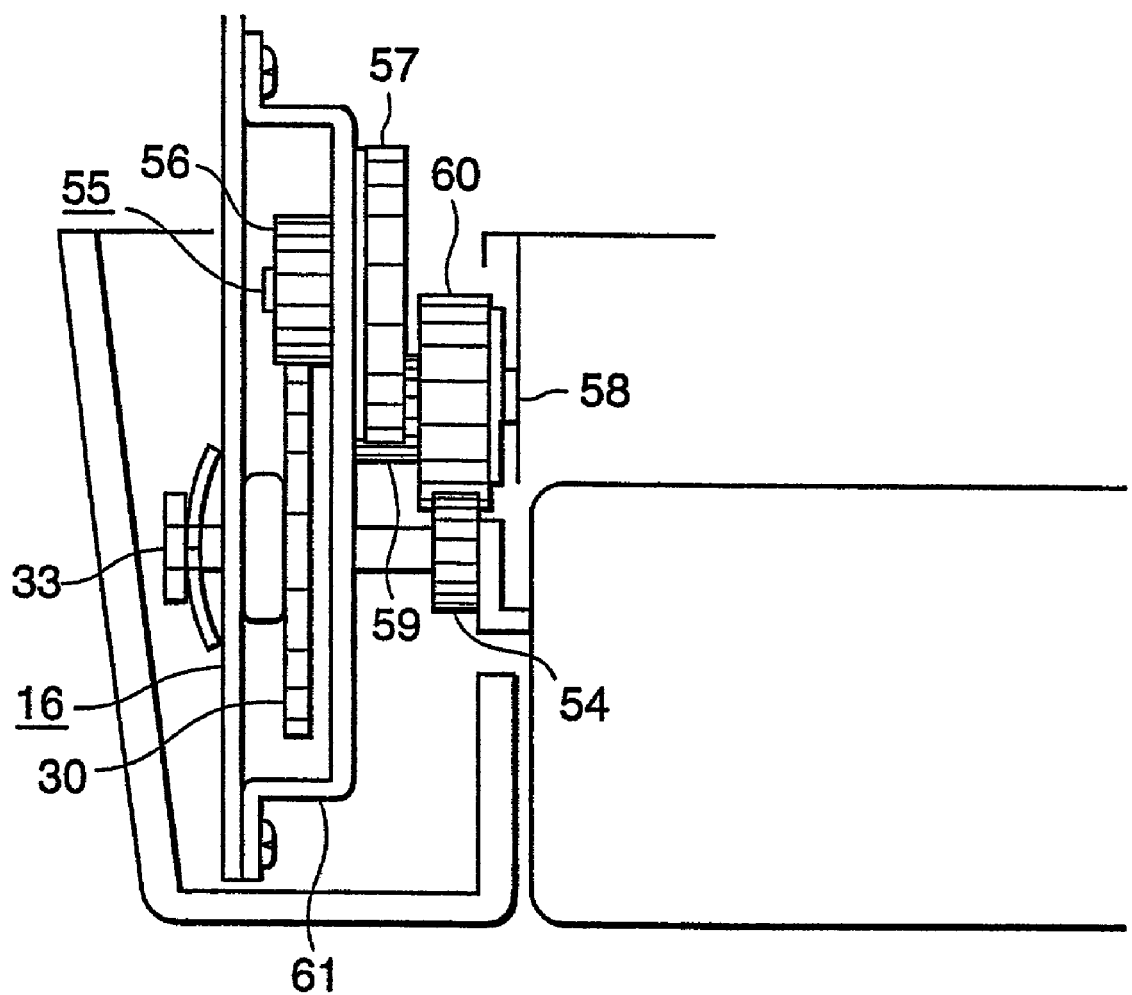
FIG. 28 is a perspective view showing the open/close mechanism of the reproducing unit 6 in a second embodiment.

FIGS. 27 and 28 are aside view and a front view, respectively, showing a modification of the shaft in the second embodiment. Here, there is shown a structure in which the gear ratios of both the rotating bodies of the display monitor 2 and the reproducing unit 6 can be arbitrarily set and in which both the shafts 33a, 33b can be provided coaxially or on any axial position separated each other.

Further, by providing the rotation interlocking mechanism with a slip rotation mechanism as interlocking releasing means, when one of the units is arbitrarily fixed, the other unit is allowed independent rotation above a given moment of rotation. When the unit deck holder 15 to which the reproducing unit 6 is fixed is to be opened, the rotation is transmitted by the deck holder gear 30 to a gear a55 and a slip gear a58, and is rotated to open it by gearing with a gear 54 on the display monitor side of the display monitor 2. At this time, previous setting of the gear ratio of each gear makes it possible to arbitrarily set the open/close angle of both the rotating bodies.

Further, the provision of the slip gear a58 as an intermediate gear with a slip rotation mechanism makes it possible for an interlocked rotary member to independently rotate against a moment of rotation above a predetermined value. A gear holder 61 as shown in FIG. 28 holds the gear a55 as an intermediate gear, and the slip gear a58 forms the rotation interlocking mechanism.

Without being limited to the above, the display monitor 2 and the reproducing unit 6 may always independently be rotated.

Figure 29:
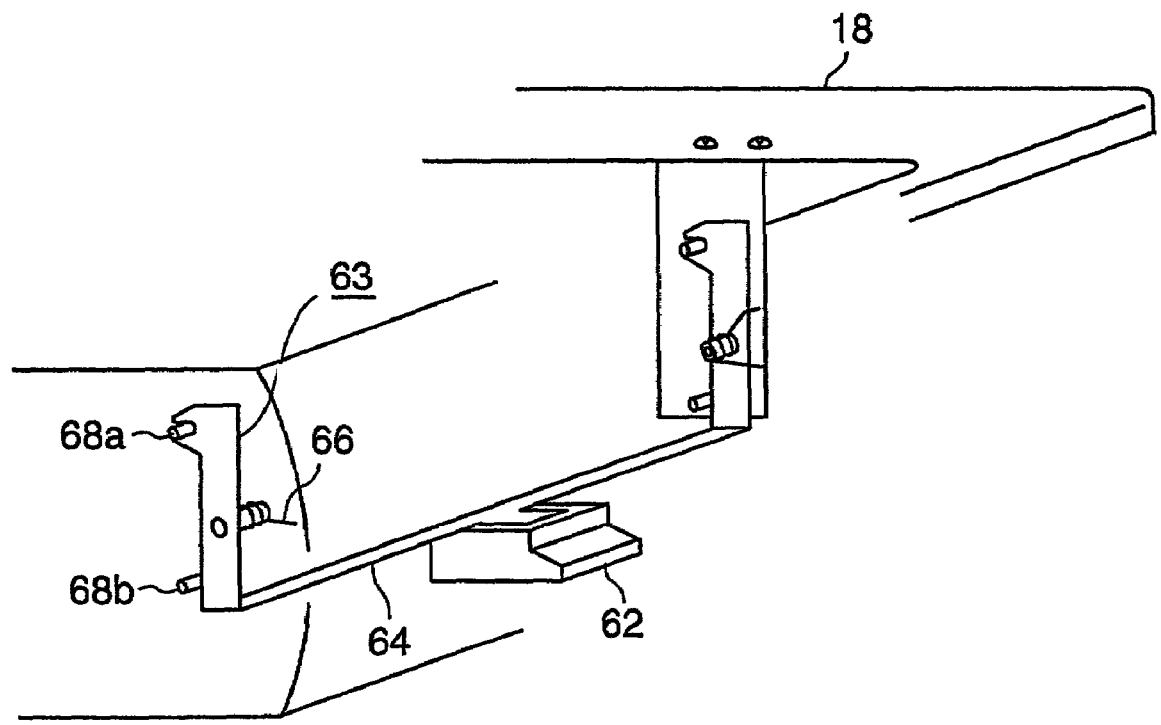
FIG. 29 is a perspective view showing the open/close mechanism of the reproducing unit 6 in a second embodiment.
Figure 30:
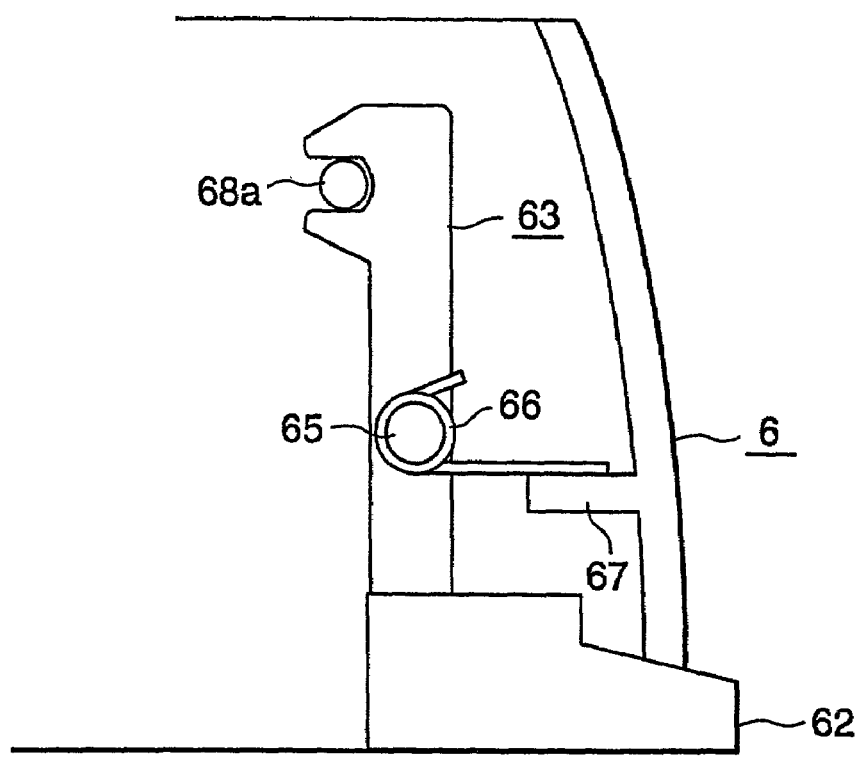
FIG. 30 is a side view showing the open/close mechanism of the reproducing unit 6 in a second embodiment.

FIGS. 29 and 30 are a perspective view and a side view, respectively, showing the open/close mechanism of the reproducing unit 6 in the second embodiment. An open/close lock lever 63 is fixed to the reproducing unit 6 and an open/close lock pin 68 is provided in the frame chassis 18. When closed, the open/close lock lever 63 is engaged with an upper stage 68a of the open/close lock pin. The lever shaft 65 is engaged with a spring 66 and a moment is applied so as to always engage it with the open/close pin 68. One end of the spring 66 is engaged with the open/close lock lever 63 and the other end with the spring receiver 67 of the reproducing unit 6.

By pushing down the open/close lock releasing button 62 in the disengaging direction of the open/close lock pin 68, the reproducing unit 6 is rotated and opened. Returning the open/close lock releasing button 62 when the reproducing unit 6 has fully opened, the lock lever 63 is fixed by engaging with a lower stage 68b of the open/close lock pin. The open/close lock lever 63 is disposed on both the right and left sides for coupling together through an open/close lock stay 64, and fixed an open/close releasing button 62 to the open/close lock stay 64.

In this example, the display monitor 2 and the reproducing unit 6 are disposed in a front, and rear position on a plane. They may also be disposed in a right and left position on a plane or aslant on a plane.

As described above, according to the video reproducing unit of the second embodiment, by disposing the display monitor 2 and the reproducing unit 6 on a plane, the elaborately designed portion of the entire equipment is further made thinner.

Further, according to the second embodiment, since the, rotation interlocking mechanism to correlate both the shafts is provided and is configured to integrate the shaft, the lock mechanism is simplified. Further, by simply opening or closing one of the units, the other unit is opened or closed dependently, and the user saves the trouble of opening or closing both the units separately.

Still further, according to the second embodiment, by providing the slip rotation mechanism, in a state in which the rotation of one of the units is fixed, the other unit is independently operated above a given moment of rotation. This gives improved freedom of disposing the other unit when in use.

THIRD EMBODIMENT

Next, as the third embodiment, an example is given in which plural pieces of subunits 69 having a slot opening 70 are disposed as a constituent in the reproducing unit 6 of the first embodiment. FIGS. 31 through 37 show the structure of the video reproducing unit in the third embodiment.

Figure 31:
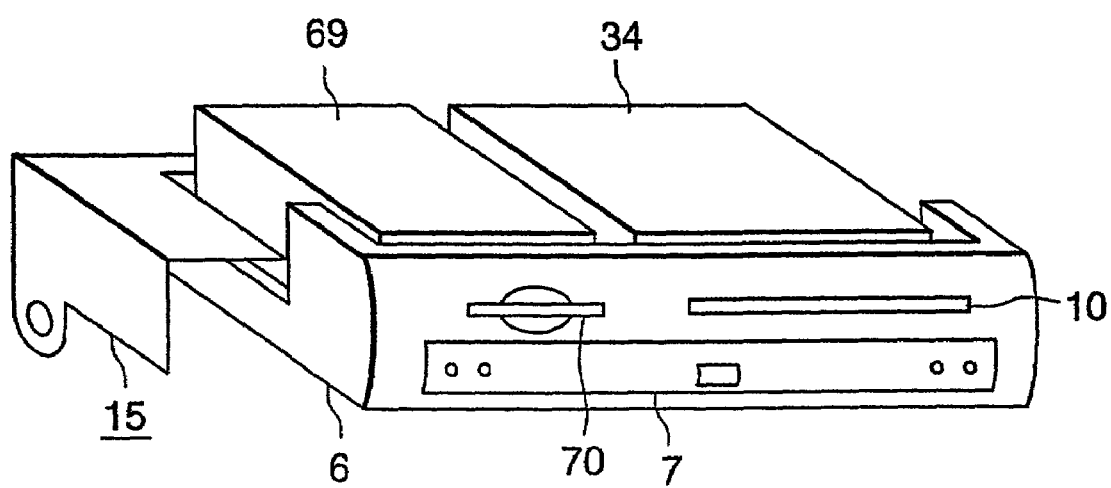
FIG. 31 is a perspective view showing an example of the reproducing unit 6 of the video reproducing equipment in a third embodiment of the invention.

FIG. 31 is a perspective view showing an example of the reproducing unit 6 of the video reproducing unit in the third embodiment. In FIG. 31, as an object that can be inserted into/rejected from the slot opening 70, there may be a media such as a magnetic disc, an optical disc, a card-type memory or a stick-type memory to be used in Personal Computer Memory Card International Association (PCMCIA), or the like, as well as an arbitrary constituent such as an expansion circuit board or a subunit 69 body.

FIGS. 32 through 37 show a mounting and dismounting structure of the remote controller 19 in the third embodiment. Here, as an example of the subunit 69 in FIG. 31, there is shown an example in which the remote controller 19 is housed in the reproducing unit 6.

Figure 32:
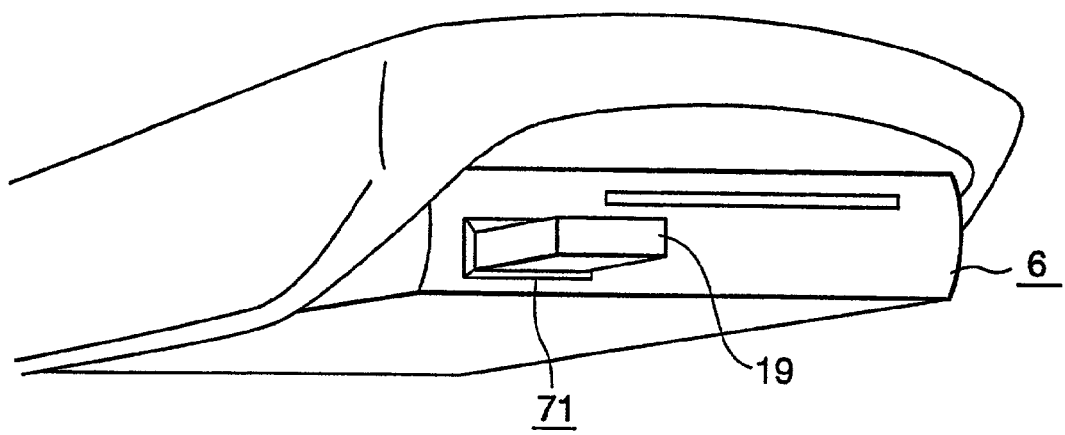
FIG. 32 is a perspective view showing the mounting/dismounting mechanism of the remote controller 19 in a third embodiment.
Figure 33:
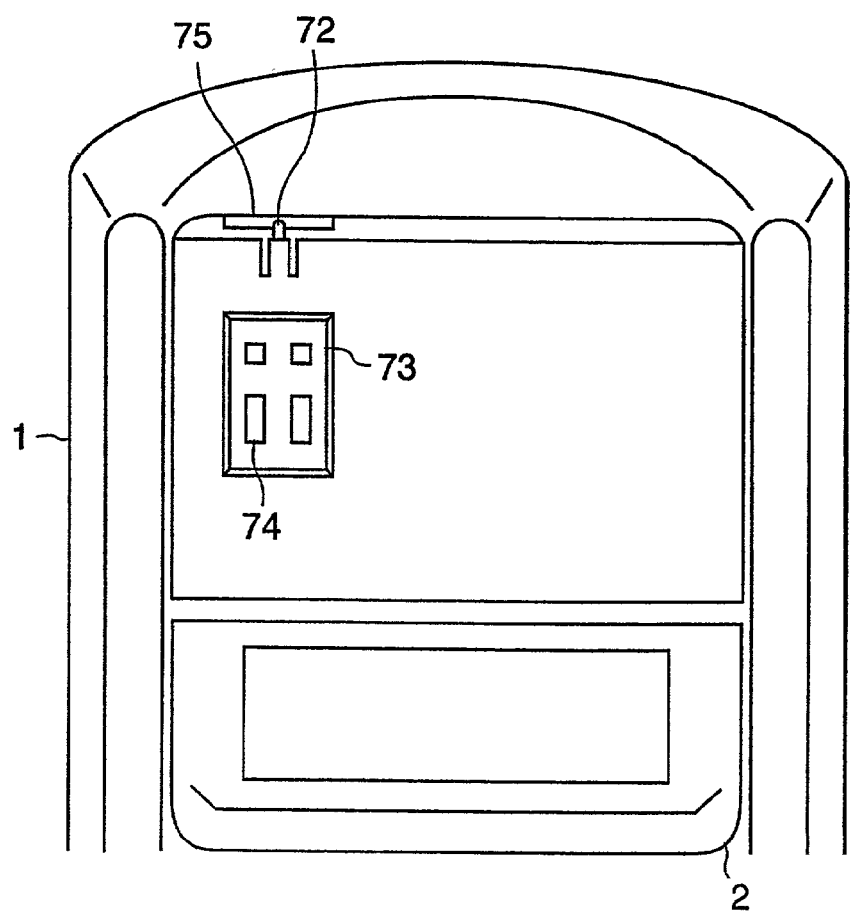
FIG. 33 is a bottom view showing the mounting/dismounting mechanism of the remote controller 19 in a third embodiment.

FIGS. 32 and 33 are a perspective view and a bottom view, respectively, showing the mounting and dismounting structure of the remote controller 19 in the third embodiment. As shown in FIG. 32, the remote controller is inserted and rejected into/from a remote controller housing 71 having a remote controller inserting port 75 in a front surface of the reproducing unit 6. As shown in FIG. 33, the bottom surface of the remote controller housing 71 is provided with a remote controller holding claw 72 for holding the remote controller 19 when housed. In addition, in order to operate the remote controller operating buttons 74 while housing the remote controller 19, an opening 73 for the remote controller buttons is provided.

Figure 34:
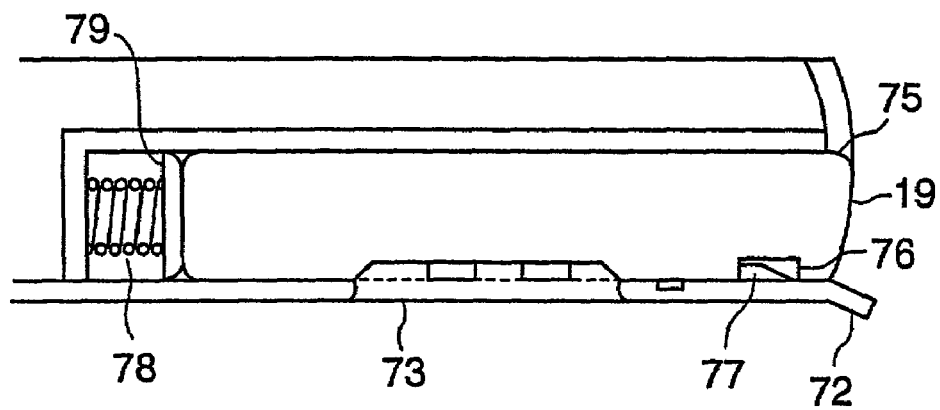
FIG. 34 is a side view showing the mounting/dismounting mechanism of the remote controller 19 in a third embodiment.
Figure 35:
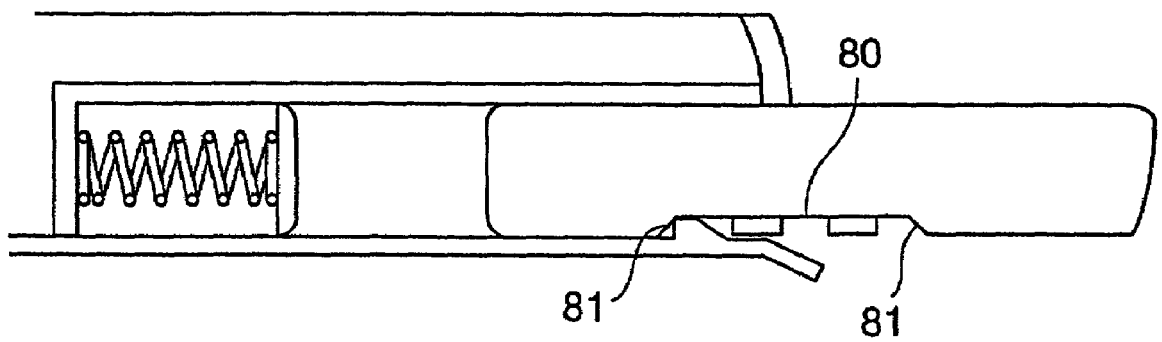
FIG. 35 is a side view showing the mounting/dismounting mechanism of the remote controller 19 in a third embodiment.
Figure 36:
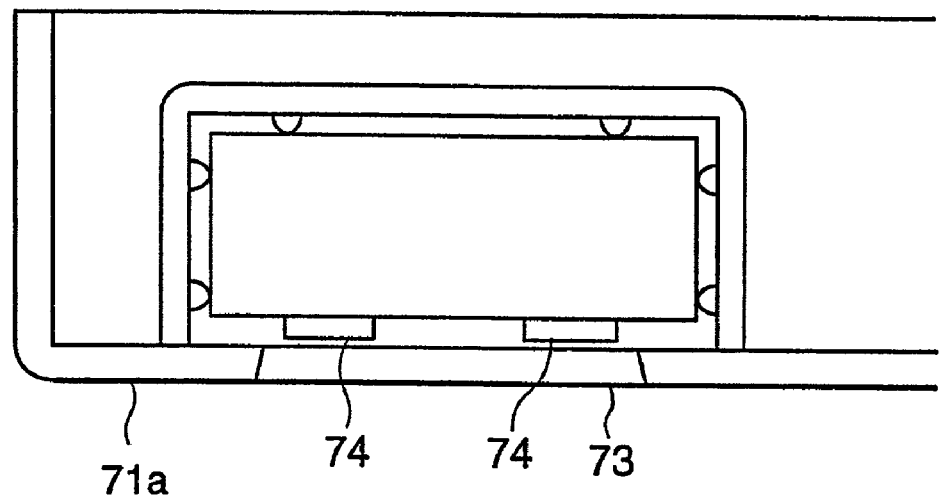
FIG. 36 is a front view showing the mounting/dismounting mechanism of the remote controller 19 in a third embodiment.
Figure 37:
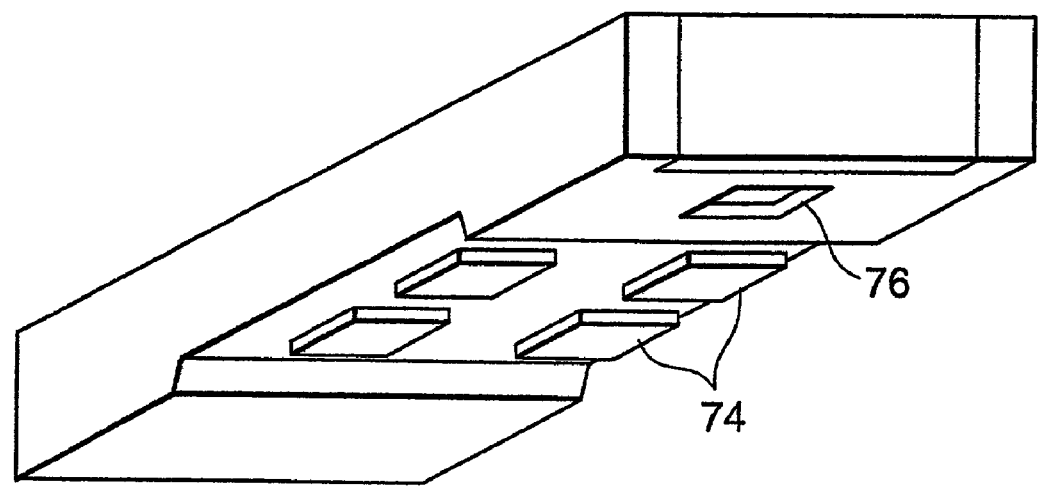
FIG. 37 is a perspective view of the remote controller 19 body in a third embodiment.

FIGS. 34 through 36 are side views and a front view, respectively, showing the mounting and dismounting structure of the remote controller 19 in the third embodiment, and showing the state in which the remote controller 19 is housed and rejected. FIG. 37 is a perspective view of the body of the remote controller 19.

As shown in FIG. 34, when the remote controller 19 is housed, a pushing spring 78 is urged through a pushing plate 79, and a remote controller holding claw 77 is engaged with a recessed, remote controller claw receiver 76, whereby the remote controller 19 is housed in position.

When the remote controller 19 is rejected, the remote controller holding claw 77 is released by holding the front end of the remote controller holding portion 72. As a result of the operation of the pushing spring 78, the remote controller 19 projects as shown in FIG. 35. In order to prevent the remote controller from jumping out of position, the remote controller holding claw 77 is engaged with an oblique step 81 in the recessed operation surface 80 of the remote controller. The remote controller 19 is thereafter pulled out by hand. Since the remote controller is restrained by the oblique step 81, the remote controller holding claw 77 will be disengaged like it slides along the oblique surface.

FIG. 36 is a sectional view as viewed from the front of the remote controller housing 71. On the operating surface of the remote controller 19 a remote controller recessed surface 80 is formed so that the remote controller operating buttons 74 do not come into contact with the bottom surface 71a of the remote controller housing.

As described above, according to the third embodiment, since the reproducing unit 6 has disposed therein a plurality of subunits having a slot opening 70, the operability of inserting and rejecting the media into/from the slot opening 70 is improved. In addition, since the plurality of units is unified into one, the number of units is reduced.

Further, according to the third embodiment, irrespective of whether the slot opening 70 is formed or not, the plurality of subunits facilitates operation of the various buttons in the respective front surfaces, recognition of each of the indicating elements, and transmission and reception of signals between the outside remote controller 19 and communication elements, or the like.

Further, according to the third embodiment, since the remote controller housing 71 is disposed in the reproducing unit 6, in a state in which the equipment body is closed, the remote controller housing 71 as well as the remote controller 19 are hidden from the aesthetic design surface, improving security.

Further, according to the third embodiment, by forming the bottom surface of the reproducing unit 6 with the opening 73 for the remote controller buttons, the remote controller operating buttons 74 can be operated while housing the remote controller 19 in the remote controller housing 71.

FOURTH EMBODIMENT

Figure 38:
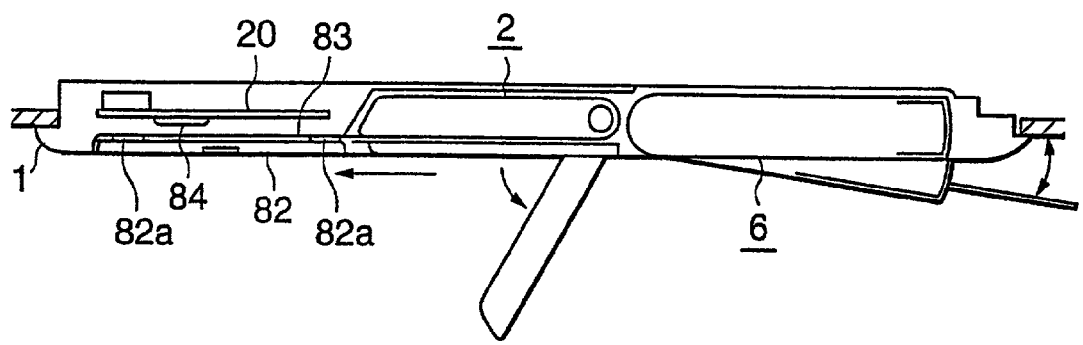
FIG. 38 is a side view showing the overall structure of the video reproducing equipment in a fourth embodiment of the invention.
Figure 39:
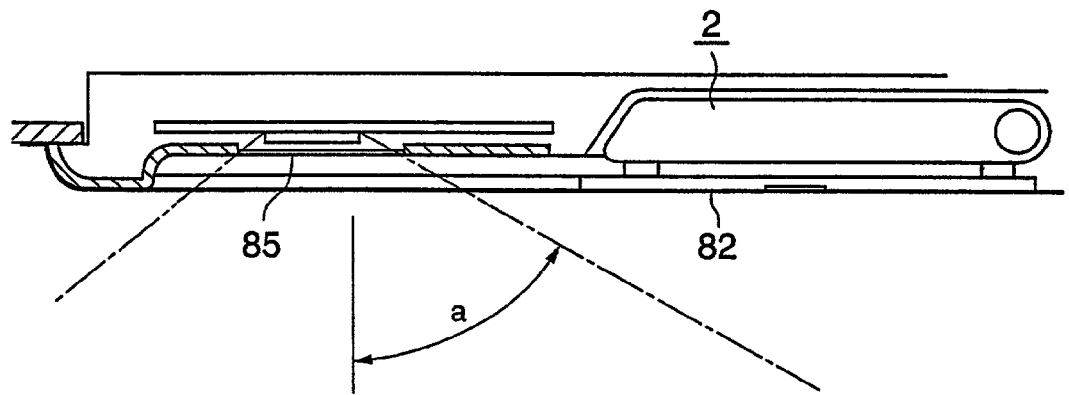
FIG. 39 is a side view showing the illumination range of an interior light 84 when the display monitor 2 is housed in a fourth embodiment.
Figure 40:
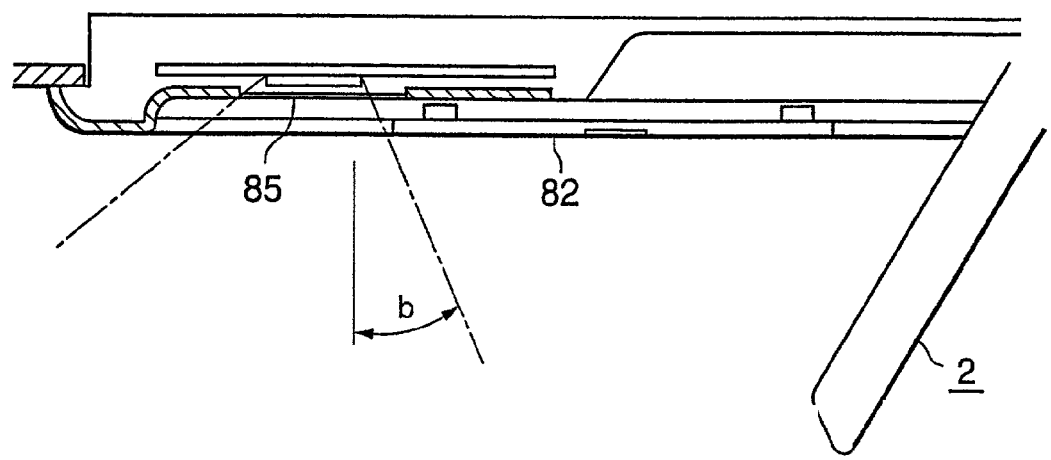
FIG. 40 is a side view showing the illumination range of the interior light 84 when the display monitor 2 is looked and listened to in a fourth embodiment.

As the fourth embodiment, there is given an example in which a door is disposed to house and protect the display monitor 2 in the second embodiment. FIGS. 38 through 40 show the structure of the reproducing unit in the fourth embodiment.

FIG. 38 is a side view showing an overall structure of the video reproducing unit in the fourth embodiment. Here, as the door for housing and protecting the display monitor 2, a sliding type slide door 82 is disposed. The slide door 82 is flat in shape. It is so arranged that a claw 82a is engaged with a guide groove 83 of the body base cover 1 so that the slide door 82 is opened or closed by sliding backward when the display monitor 2 is erected.

Without being limited to the above example, the slide door 82 may be opened and closed in the right and left direction or in the forward direction of the display monitor 2.

Further, in this example, the main electric circuit board 20 disposed inside the body base cover 1 is provided with an interior light 84 inside the vehicle compartment. FIG. 39 is a side view showing the illumination range of the interior light 84 when the display monitor 2 is housed. In this case, as shown in FIG. 39, in a state in which the display monitor 2 is closed and the slide door 82 is closed, the illumination light of the interior light 84 penetrates through an illumination light panel 85 and illuminates virtually the whole surface of the vehicle compartment. The user who looks and listens to the video of the display monitor 2 is illuminated at an angle of "a".

FIG. 40 is a side view showing the illumination range by the interior light 84 at the time of looking and listening to the display monitor 2. In this manner, when the video is looked and listened to while erecting and opening the display monitor 2, the illumination light can be shielded up to the angle "b" by holding the slide door 82 on the way of the guide groove 83.

In this manner, according to the fourth embodiment, since the slide door for housing and protecting the display monitor 2 is disposed, the surface of the display screen 11 is protected by the slide door 82 when the display monitor 2 is closed. The surface of the display screen 11 is thus prevented from being stained or damaged when not in use. Further, by hiding the display monitor 2, the security is improved.

Still further, according to the fourth embodiment, the main electric circuit board 20 disposed in the equipment body is provided with the interior light 84 for illuminating inside the vehicle compartment so that the illumination light of the interior light 84 is partly shielded by the slide door 82. Therefore, the illumination light of the interior light 84 illuminates only the front seat and does not the rear seat. When the user seated in the rear seat looks and listens to the video on the display screen 11, this shields the back light caused by the illumination light, improving the visibility of the screen.

While the above embodiments have described by giving examples in which, e.g., a DVD is used as the information memory medium to be reproduced by the reproducing unit 6, without being limited to the above, other information memory media may be used: optical discs such as a video CD, a compact disc read only memory (CD-ROM), a CD recordable (CD-R), a CD rewritable (CD-RW), a digital versatile disk read only memory (DVD-ROM), aDVD random access memory (DVD-RAM), a DVD rewritable (DVD-RW), a mini disk (MD) or the like; magnetic discs such as a flexible disc and a hard disk; memory cards such as an integrated circuit memory card (IC memory card), a magnetic memory card, an optical memory card, or the like; magnetic tapes such as a video tape, or the like; detachable type of solid memory media using a memory IC, or the like.

Further, while the above embodiments have described by giving an example using a liquid crystal display as an example of the display unit, without being limited to the above, various types of other display monitors may be used: a cathode ray tube display (CRT display), a plasma display, an electro luminescence display (EL display), an LED display, a vacuum fluorescence display (VFD display), a projection type display, a head up display, or the like.

Further, while the above embodiments have described by giving an example in which this invention was applied to the video reproducing unit for reproducing the video information such as cinemas or the like stored mainly in a DVD or the like, without being limited to the above, an equipment for reproducing and displaying the video information, aside from the images of a television set or a video recorder may be used: maps, routes, or the like from a car navigation device; traffic information such as a traffic congestion information from a vehicle information communication system (VICS); vehicle information such as a vehicle speed, an engine rotational speed, or the like, from an electronic vehicle control unit; and video information from an onboard personal computer (PC). Taking such an arrangement, it is possible to provide a compact onboard information reproducing unit which is able to reproduce and display various pieces of information inside the vehicle compartment.

Further, while the embodiments have described by giving an example assuming mainly a video reproducing unit to be mounted on a vehicle, without being limited to the above, the invention may be applied to: a video reproducing unit to be mounted on a mobile body such as a train, a ship, an airplane, or the like, as well as to a portable information terminal device to be hand-carried by a person such as a personal digital assistant (PDA), or the like. Further, without being limited to an equipment to be mounted in a mobile body, the invention may also be applied to a video reproducing unit which is fixedly mounted in an audio room in an office or at home.

As described in each of the above embodiments, this invention has the following features.

The invention provides a structure where, in an integrated type video reproducing unit made of a plurality of units whose functions are divided, at least two or more units are disposed in an upper and lower position, and the chassis to hold the units disposed in the upper and lower position is provided with a shaft to rotate each unit.

The invention provides a structure where an open/close mechanism in which, when rotating, the units disposed in the upper and lower position are rotated simultaneously to a predetermined angle on the same axis, and the open/close mechanism has a structure for holding the units between the chassis and at least one of the units and, after the unit has rotated to a predetermined angle and fixed thereto, at least one of the units is further rotated to an arbitrary or a predetermined angle and is fixed thereto.

The invention provides a structure where, at the time the units are closed by rotating them, part or all of the units are housed inside the disposing surface of the equipment, abating the amount of projection beyond the outer space of disposing surface.

The invention provides a structure where, as limiting means for the open/close angle, at least one of the units has a pin to be engaged with a slot formed along the circumference about the axis of rotation and, on the other hand, the unit that is fixed at a predetermined angle has a pin and a recessed groove into which the pin is fit so as to fix the rotation, and a cam for releasing the engagement of the pin is disposed on the shaft of the other unit.

The invention provides a structure where a rotary unit made of an insertable and rejectable information memory medium or an arbitrary subunit and, after the rotary movement, is fixed at a predetermined angle from the original disposing surface of the equipment body, and the surface for inserting and rejecting the information memory medium or the subunit projects from the original surface on which the equipment body is positioned so that the object to be inserted thereinto, and rejected therefrom, at a predetermined angle from the disposing surface.

The invention provides a structure where the remote controller for operating the equipment is detachably mounted in the equipment body.

The invention provides a structure where each unit is disposed in the front and rear or right and left position, and has an open/close mechanism in which the shaft is disposed in each unit so as to independently rotate and arbitrarily fix.

The invention provides a structure where an interlocking rotation mechanism to interlock the rotation of each unit is provided so that, by rotating one of the units, the other unit is rotated linked therewith.

The invention provides a structure where a slip rotating mechanism is provided with the interlocking rotation mechanism so that, when one unit has arbitrarily fixed, the other unit allows independent rotation when moment of rotation is above a predetermined one.

The invention provides a structure where a plurality of constituents are housed in one of the rotary unit.

The invention provides a structure where an inserting and holding mechanism is provided to enable the remote controller to be detachably mounted on one of the rotary units, and where the rotary unit is provided with an opening which permits operation of the operating buttons of the remote controller while mounting the remote controller in position.

The invention provides a structure where a door is disposed in the equipment body to cover the rotary units after the rotary units have housed inside the equipment body.

The invention provides a structure where an interior light is disposed in the equipment body and the door is disposed such that the illumination light of the interior light is shielded within a predetermined range.

Further, the invention offers a compact and package-integrated type video reproducing unit for use in a vehicle, in which the equipment is disposed on the ceiling of the vehicle compartment, and in which the projected area of disposition on the vehicle ceiling as well as the height of the elaborately designed portion from the vehicle ceiling is minimized as much as possible, and has the following features.

The invention provides a structure where a DVD player and a display monitor are disposed in the upper and lower position to make an integrated equipment.

The invention provides a structure where the display monitor is disposed under the DVD player and shaft is disposed in a chassis which holds both so that they are rotatable, and in which a mechanism to fix the DVD player at a predetermined angle and a cam mechanism to release this fixing are disposed in the shaft.

The invention provides a structure where a lock mechanism is disposed to hold the DVD player in a sandwiched manner between the chassis and the display monitor and, by pushing an open/close button when in use, the lock is released to open both the DVD player and the display monitor simultaneously while rotating. In this manner, the DVD player is fixed after rotation to the predetermined angle, and the display monitor rotated linked with the rotation of the DVD player is kept on rotating to open so as to enable looking and listening to the display monitor at an arbitrary angle.

The invention provides a structure where, in a state in which the units are closed when housed, the DVD player goes into the inside of the vehicle ceiling and, in a state in which the units are opened when in use, the DVD player is fixed to the ceiling of the vehicle on the slant such that a disc inserting opening in the DVD player is exposed.

The invention provides a structure where a remote controller is detachably mounted in the equipment body or in one of the units.

INDUSTRIAL APPLICABILITY

As described above, the video reproducing unit according to the invention is suitable for providing a small-sized video reproducing unit which is disposed on the ceiling or the like in a vehicle compartment, and which is superior in the operability and visibility when in use as well as in the housing efficiency when housed.

The invention claimed is:

1. A video reproducing apparatus comprising:
   at least a pair of units having separate housings; and
   a chassis for holding said units, the chassis including:
      a supporting unit that supports said pair of units during displacement; and
      a fixing unit that fixes the displacement;
   wherein said pair of units are displaced in respective directions and fixed and housed in a predetermined position, wherein one of said pair of units is a reproducing equipment for reproducing video information and the other unit is a display unit for displaying the reproduced video information therefrom.

2. The video reproducing equipment according to claim 1, wherein said pair of units are respectively disposed in an upper and lower position.

3. The video reproducing equipment according to claim 2, wherein one of said pair of units is held between the other unit in said chassis.

4. The video reproducing equipment according to claim 1, wherein said supporting unit simultaneously displaces said pair of units to the predetermined position.

5. The video reproducing equipment according to claim 1, wherein, in a state where the displacement of one of said pair of units is fixed in the predetermined position, the other unit is independently displaced and fixed within a predetermined range.

6. The video reproducing equipment according to claim 1, wherein said equipment is disposed on a plane having a recessed portion, and wherein at least part of one of said pair of units is displaced so as to receive it into said recessed portion.

7. The video reproducing equipment according to claim 1, further comprising:
   a limiting unit that limits the range of displacement of at least one of said pair of units.

8. The video reproducing equipment according to claim 7, wherein the unit to be limited and said chassis are provided, as the limiting unit, with a recessed portion and a projected portion which comes into engagement with said recessed portion.

9. The video reproducing equipment according to claim 1, wherein an information memory medium or a constituent is inserted or ejected into/from at least one of said pair of units, and said pair of units are displaced to a first predetermined position in which said one of said pair of units is housed and to a second predetermined position in which the information memory medium or the constituent is inserted and ejected thereinto/therefrom.

10. The video reproducing equipment according to claim 1, wherein said pair of units are disposed in a front and rear position.

11. The video reproducing equipment according to claim 1, wherein further comprising interlocking means for interlocking the displacement of each of said pair of units, wherein the other unit is displaced linked with the displacement of said one of said pair of units.

12. The video reproducing equipment according to claim 11, wherein said interlocking means comprises interlocking releasing means for releasing the interlocking under a predetermined condition, wherein, in case the displacement of one of said pair of units is fixed, or in case an external force beyond a predetermined level is applied to the other unit, the other unit is independently displaced.

13. The video reproducing equipment according to claim 1, wherein a plurality of constituents are housed inside one of said pair of units.

14. The video reproducing equipment according to claim 1, further comprising:
- a door for covering one of said pair of units after said one of said pair of units has housed.

15. The video reproducing equipment according to claim 1, further comprising:
- a remote controller for operating said equipment, said remote controller being detachably mounted on said equipment body or one of said pair of units.

16. The video reproducing equipment according to claim 15, wherein an opening is formed such that said remote controller is operated while mounting the remote controller on said equipment body.

17. The video reproducing equipment according to claim 1, wherein said equipment is disposed on a ceiling of a vehicle compartment.

18. A video reproducing apparatus comprising:
- at least a pair of units;
- a chassis for holding said units, said chassis including:
- a supporting unit that supports said pair of units during displacement;
- a fixing unit that fixes the displacement, wherein said pair of units are displaced in respective directions and fixed and housed in a predetermined position;
- a provisional fixing unit that provisionally fixes the displacement of one of said pair of units; and
- a releasing unit that releases the provisional fixing unit;
- wherein said releasing unit releases the provisional fixing linked with the displacement of the other unit.

19. The video reproducing equipment according to claim 18, wherein one of said pair of units and said chassis are provided, as the provisional fixing unit, with a recessed portion and a projected portion which comes into engagement with said recessed portion, and wherein a cam is provided for releasing the fitting linked with the other unit.

20. A video reproducing apparatus comprising:
- at least a pair of units;
- a chassis for holding said units, the chassis including:
- a supporting unit that support said pair of units during displacement;
- a fixing unit that fixes the displacement, wherein said pair of units are displaced in respective directions and fixed and housed in a predetermined position;
- a door for covering one of said pair of units after said one of said pair of units has housed; and
- a light for illuminating a space in which said equipment is disposed, wherein said door is disposed to shield the illuminated light within a predetermined range.

* * * * *